United States Patent
Sugawara et al.

(10) Patent No.: US 7,973,887 B2
(45) Date of Patent: *Jul. 5, 2011

(54) COLOR FILTER FOR TRANSFLECTIVE TYPE LIQUID CRYSTAL DISPLAY

(75) Inventors: Masayuki Sugawara, Tokyo-to (JP); Mitsuru Iida, Tokyo-to (JP); Ryutaro Harada, Tokyo-to (JP); Tomohisa Ishizawa, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.
This patent is subject to a terminal disclaimer.

(21) Appl. No.: 12/819,576

(22) Filed: Jun. 21, 2010

(65) Prior Publication Data
US 2010/0253889 A1 Oct. 7, 2010

Related U.S. Application Data

(62) Division of application No. 11/999,320, filed on Dec. 5, 2007, now Pat. No. 7,768,599, which is a division of application No. 10/513,968, filed as application No. PCT/JP2003/005785 on May 8, 2003.

(30) Foreign Application Priority Data

May 9, 2002 (JP) .................. 2002-133979
Dec. 27, 2002 (JP) .................. 2002-382536
Dec. 27, 2002 (JP) .................. 2002-382540

(51) Int. Cl.
*G02F 1/1335* (2006.01)
(52) U.S. Cl. ...................... 349/106; 349/114
(58) Field of Classification Search .......... 349/114, 349/106, 113, 112
See application file for complete search history.

(56) References Cited

U.S. PATENT DOCUMENTS
5,946,065 A 8/1999 Tagusa et al.
(Continued)

FOREIGN PATENT DOCUMENTS
EP 1 109 053 A2 6/2001
(Continued)

OTHER PUBLICATIONS

USPTO OA mailed May 7, 2007 in connection with U.S. Appl. No. 10/513,968.

(Continued)

*Primary Examiner* — Wen-Ying P Chen
(74) *Attorney, Agent, or Firm* — Ladas & Parry LLP

(57) ABSTRACT

The main object of the present invention is to provide a color filter for a transflective type color liquid crystal display which is easily produced and capable of displaying the same color tone with both of a reflecting light and a transmitting light, and shows light scattering in a reflective light region. In order to attain the above mentioned object, the present invention provides a color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, and a refractive index difference between the reflective light coloring layer and a layer in contact with the surface of the convex-concave formed side of the reflective light coloring layer, is 0.1 or more. Further, a main object of the present invention is to provide a color filter for transflective type liquid crystal display comprising a transparent membrane pattern region obtained by laminating: a transparent substrate; a transparent membrane pattern layer comprising a transparent membrane formed in a pattern on the transparent substrate; and a coloring layer formed so as to cover the transparent membrane pattern layer.

6 Claims, 14 Drawing Sheets

U.S. PATENT DOCUMENTS

| | | |
|---|---|---|
| 6,195,140 B1 | 2/2001 | Kubo et al. |
| 6,259,500 B1 | 7/2001 | Kijima et al. |
| 6,455,208 B1 * | 9/2002 | Yamashiki et al. ............... 430/7 |
| 6,476,889 B2 | 11/2002 | Urabe et al. |
| 6,522,377 B2 | 2/2003 | Kim et al. |
| 6,542,209 B2 * | 4/2003 | Kim et al. .................... 349/106 |
| 6,657,687 B2 | 12/2003 | Takizawa |
| 6,697,135 B1 * | 2/2004 | Baek et al. .................... 349/106 |
| 6,697,138 B2 | 2/2004 | Ha et al. |
| 6,809,791 B2 | 10/2004 | Yi et al. |
| 6,847,426 B2 | 1/2005 | Fujimori et al. |
| 2001/0004276 A1 | 6/2001 | Urabe et al. |
| 2002/0036730 A1 * | 3/2002 | Baek et al. .................... 349/106 |
| 2003/0016321 A1 * | 1/2003 | Takizawa .................... 349/113 |
| 2003/0179327 A1 | 9/2003 | Nonaka et al. |
| 2005/0174511 A1 | 8/2005 | Sugawara et al. |
| 2008/0151153 A1 | 6/2008 | Sugawara et al. |

FOREIGN PATENT DOCUMENTS

| | | |
|---|---|---|
| JP | 2000-144048 A | 5/2000 |
| JP | 2000-266930 A | 9/2000 |
| JP | 2001-033778 A | 2/2001 |
| JP | 2001-125094 A | 5/2001 |
| JP | 2001-166289 A | 6/2001 |
| JP | 2002-318382 A | 10/2002 |
| JP | 2002-341331 A | 11/2002 |
| JP | 2002-350824 A | 12/2002 |
| JP | 2004-212675 A | 7/2004 |
| JP | 2004-212676 A | 7/2004 |

OTHER PUBLICATIONS

USPTO OA mailed Oct. 31, 2007 in connection with U.S. Appl. No. 10/513,968.
USPTO OA mailed Jun. 20, 2008 in connection with U.S. Appl. No. 10/513,968.
USPTO OA mailed Mar. 20, 2009 in connection with U.S. Appl. No. 10/513,968.
USPTO OA mailed Sep. 28, 2009 in connection with U.S. Appl. No. 10/513,968.
USPTO OA mailed May 26, 2010 in connection with U.S. Appl. No. 10/513,968.
USPTO OA mailed Mar. 19, 2009 in connection with U.S. Appl. No. 11/999,320.
USPTO OA mailed Sep. 2, 2009 in connection with U.S. Appl. No. 11/999,320.
USPTO NOA mailed Mar. 23, 2010 in connection with U.S. Appl. No. 11/999,320.
USPTO OA mailed Apr. 28, 2010 in connection with U.S. Appl. No. 12/401,824.
USPTO OA mailed Sep. 14, 2010 in connection with U.S. Appl. No. 12/819,603.

* cited by examiner

FIRST EMBODIMENT ←5→ ←6→
SECOND EMBODIMENT ←5→ ←6→

FIG. 11
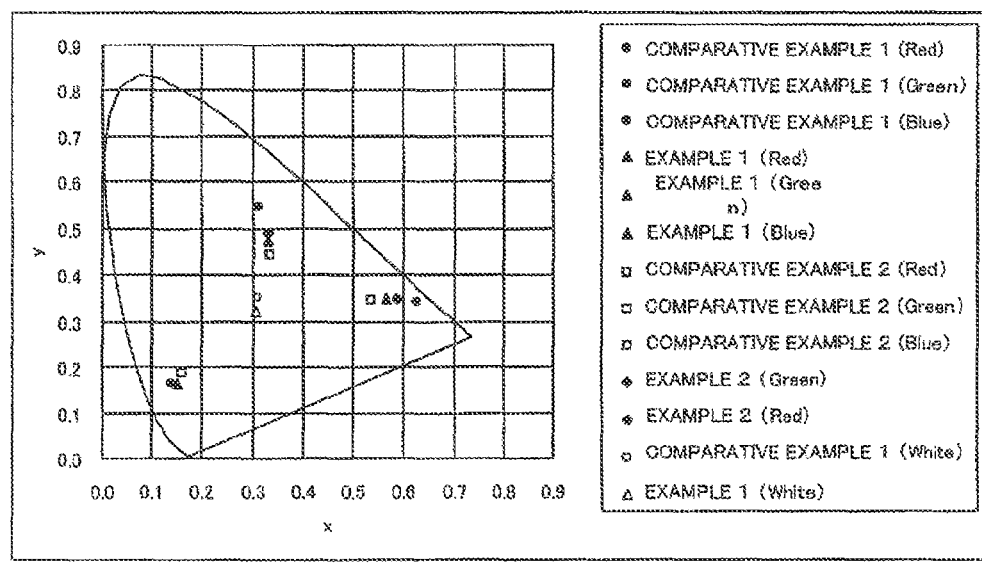
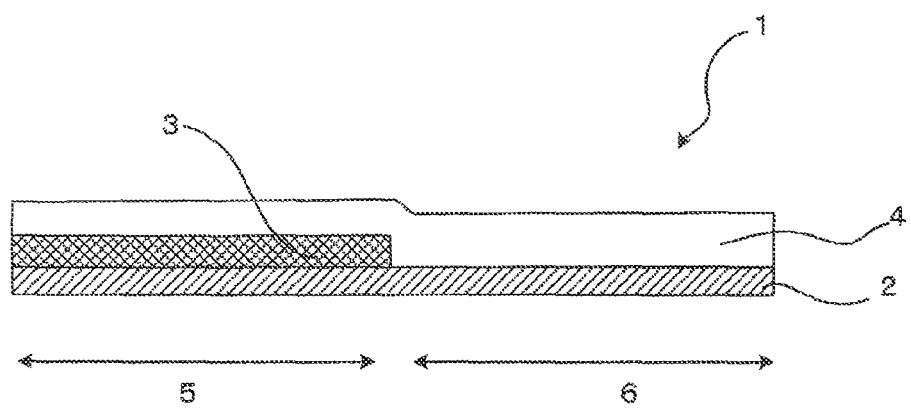
FIG. 12
PRIOR ART

COLOR FILTER FOR TRANSFLECTIVE TYPE LIQUID CRYSTAL DISPLAY

TECHNICAL FIELD

The present invention relates to a color filter for a transflective type color liquid crystal display used in a transflective type color liquid crystal display.

BACKGROUND ART

Conventionally, as a transmissive type liquid crystal display, transmissive type color liquid crystal displays, which perform color display using a back light, placed on the rear surface or side surface of an electrode substrate positioned at the back surface side, as a light source is widely spread.

On the other hand, recently, liquid crystal displays are expected for use as portable displays such as mobile equipments and the like, taking advantage of features such as low power consumption and weight saving is possible. However, in the transmissive type color liquid crystal displays having a built-in back light as described above, the built-in light source consumes high power. Therefore, there are problems that the usable time of a battery is short and that the apparatus is heavy and bulky since the proportion of a battery in the apparatus is large.

Therefore, a reflective type color liquid crystal display having no built-in back light is put into practical use. Since this reflective type color liquid crystal display has no built-in back light, low power consumption can be realized, the apparatus can be small, light and thin, namely, suitable as a mobile display.

However, since a reflective type color liquid crystal display does not sufficiently function in a dark place of poor outer light. Therefore, although it slightly sacrifices the portable property, a portable liquid crystal display of transmissive type and reflective type combined together is practically extremely useful.

In the above mentioned transmissive type color liquid crystal display, a displaying function decreases remarkably under strong outer light such as outdoor and the like, while in a reflective type color liquid crystal display, utterly oppositely, a displaying function increases. In a place of poor outer light, the reflective type color liquid crystal display does not function at all, while the transmissive type color liquid crystal display manifests further increased visibility in proportion to darkness of peripheral areas.

In view of such circumstances, recently, transflective type liquid crystal displays having a function of the transmissive type color liquid crystal display and a function of the reflective type color liquid crystal display combined together are provided. These displays are suitably used as portable terminals and the like used both under strong outer light such as outdoor and the like and under poor outer light such as indoor and the like (see, Japanese Patent Application Laid-Open (JP-A) No. 2002-341331 and JP-A No. 2002-350824).

Also when displaying with such a transflective type color liquid crystal display, a color filter is necessary likewise. However, in a reflective light region, approached outer light usually passes through a color filter twice, while in a transmissive light region, the light usually passes through a color filter once. Therefore, if the same tone is tried to be obtained by using the same coloring material, it is necessary that the thickness of the color filter in the reflective light region is ½ of the thickness of the color filter in the transmissive light region. And in the reflective light region, it is necessary to form a light scattering layer separately like in conventional reflective type color liquid crystal displays. For the above mentioned reasons, a color filter used in the transflective type color liquid crystal displays requires an extra effort in manufacturing.

For example, there is also a constitution, as a color filter 1 shown in FIG. 12, in which the thickness of a coloring layer is reduced to half by forming one transparent layer 3 in between a substrate 2 and a coloring layer 4 in a reflective light region 5. However, it is difficult to make the thickness constant in the reflective light region 5 provided with the transparent layer and a transmissive light region 6 composed only of the coloring layer. As a result, when the color filter is used to constitute a liquid crystal display, there are problems that a transparent electrode such as ITO formed on the color filter is disconnected or that a gap will not be constant.

DISCLOSURE OF THE INVENTION

The present invention has been made in view of the above mentioned problems and the main object is to provide a color filter for transflective type color liquid crystal display which is easily produced and capable of displaying the same color tone with both of a reflecting light and a transmitting light.

In order to attain the above mentioned object, the present invention provides a color filter for transflective type liquid crystal display comprising a transparent membrane pattern region obtained by laminating: a transparent substrate; a transparent membrane pattern layer comprising a transparent membrane formed in a pattern on the transparent substrate; and a coloring layer formed so as to cover the transparent membrane pattern layer.

In the present invention, since the above mentioned transparent membrane pattern layer, which is a transparent membrane formed in a pattern, is provided on a transparent substrate, the coloring property of a reflective light region or transmissive light region can be adjusted and a color filter for transflective type liquid crystal display, wherein the coloring property of the reflective light region and the coloring property of the transmissive light region are equivalent, can be obtained.

In the first embodiment of the present invention, the transparent membrane pattern region can be used as a reflective light region, and a coloring layer region, comprising the transparent substrate and the coloring layer formed on the transparent substrate, can be used as a transmissive light region. Since the above mentioned transparent membrane pattern region has a pattern composed of the transparent membrane, in contrast to the above mentioned coloring layer region not having the transparent membrane, the color purity can be made pale as compared with transmitting light only for the coloring layer. And even when outer light passes through the above mentioned transparent membrane pattern region twice, the same coloring property as that obtained when back light passes through the above mentioned coloring layer region once can be obtained. For this reason, by using this transparent membrane pattern region as the reflective light region, the coloring property of the reflective light region can be made equivalent to the coloring property of the transmissive light region.

Further, in the second embodiment, the transparent membrane pattern region can be used as a transmissive light region, and a transparent membrane uniform region, obtained by laminating: the transparent substrate; a transparent membrane uniform layer comprising the transparent membrane formed uniformly on the transparent substrate; and the coloring layer formed on the transparent membrane uniform layer, can be used as a reflective light region.

In the above mentioned transparent membrane pattern region, the transparent membrane is formed in a pattern, and in the above mentioned transparent membrane uniform region, the transparent membrane is formed uniformly on the whole surface. Therefore, the above mentioned transparent membrane uniform region is largely influence by the transparent membrane, as compared with the above mentioned transparent membrane pattern region, and color purity of the transmitted light can be made pale. For this reason, the coloring property, when the back light passes through the transparent membrane pattern region once, and the coloring property, when the back light passes through the transparent membrane uniform region twice, can be made similar. And it is possible to approximate the coloring property in the transmissive light region and the coloring property in the reflective light region by using the above mentioned transparent membrane uniform region as the reflective light region and using the above mentioned transparent membrane pattern region as the transmissive light region.

Further, since the transparent membrane is provided on the above mentioned transparent substrate in the transparent membrane uniform region, when the coloring layer is formed on the transparent membrane, it is possible to make the thickness thereof equal to the thickness of the transparent membrane pattern region having a pattern on the above mentioned transparent substrate.

In this embodiment, it is preferable that an area ratio of a region, where the transparent membrane is formed, in the transparent membrane pattern region (transparent membrane forming area/transparent membrane pattern region area) is in a range of 0.3 to 0.5.

The area ratio of the transparent membrane formed region in the above mentioned transparent membrane pattern region is most preferably in the above mentioned range based on the current processing precision. Under this condition, it is possible to approximate the coloring property in the reflective light region and the coloring property in the transmissive light region to the maximum extent. When the area ratio of the transparent membrane formed region in the above mentioned transparent membrane pattern region is smaller than the above mentioned range, it is difficult to uniformalize the thickness in the reflective light region and in the transmissive light region. And when larger than the above mentioned range, it is difficult to approximate the color properties thereof, being not preferable.

In this embodiment, it is preferable that the thickness of the transparent membrane forming the transparent membrane pattern layer and the transparent membrane uniform layer is in a range of 0.5 to 3.0, when the thickness of the coloring layer, when the coloring layer is used by itself in the transmissive light region, is 1. When the thickness of the transparent membrane forming the above mentioned transparent membrane pattern layer and the above mentioned transparent membrane uniform layer is in the above mentioned range and when the area ratio of the transparent membrane formed region in the above mentioned transparent membrane pattern region is in the above mentioned range, it is possible to further approximate the coloring property in the reflective light region and the coloring property in the transmissive light region.

In the present invention, the above mentioned transparent membrane pattern layer may comprise a pattern composed of island shaped transparent membrane or the above mentioned transparent membrane pattern layer may comprise a pattern composed of pore portion formed, in a pattern, in the transparent membrane. These are appropriately selected and used depending on the apparatus, conditions and the like in manufacturing.

In the present invention, it is preferable that the island shaped portion or the pore portions in the transparent membrane pattern layer is in the form of cylinder. By forming the island shaped portion or the pore portions in the transparent membrane pattern layer into a cylindrical shape, adjustment and design of the above mentioned area ratio and formation of pattern will become easy in manufacturing the transflective type color filter, and it is also preferable in view of a manufacturing efficiency and the like.

Further, in the present invention, it is preferable that the thickness of the transparent membrane, forming the transparent membrane pattern layer or forming the transparent membrane pattern layer and the transparent membrane uniform layer, is 0.5 to 3.5 µm.

By forming the thickness of the above mentioned transparent membrane pattern layer, or of the transparent membrane pattern layer and the transparent membrane uniform layer in the above mentioned range, it is possible to approximate the coloring property in the above mentioned reflective light region and the coloring property in the above mentioned transmissive light region to the maximum extent, in usual color filters.

Furthermore, in the present invention, it is preferable that a transmittance spectral of the transparent membrane at wavelengths from 380 nm to 780 nm is 85% or more.

The reason for this is that, when the transparency of the above mentioned transparent membrane is in the above mentioned range, the coloring property of the coloring layer is less likely to be influenced in the color filter for transflective type liquid crystal display of the present invention. Consequently, it is possible to further approximate the coloring property in the reflective light region and the coloring property in the transmissive light region.

The present invention provides a transflective type liquid crystal display comprising the color filter for transflective type liquid crystal display according to the first embodiment or the second embodiment.

The reason for this is that, in the present invention, it is possible to provide a liquid crystal display, manifesting the coloring property in the transmissive light region equivalent to the coloring property in the reflective light region, by using the above mentioned color filter for transflective type liquid crystal display.

Further, in the third embodiment, the present invention provides a color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, and a refractive index difference, between the reflective light coloring layer and a layer in contact with the surface of the convex-concave formed side of the reflective light coloring layer, is 0.1 or more.

In this embodiment, it is possible to obtain light scattering effect against reflective light and to uniformalize color tones of the reflective light and the transmissive light at the same time only by forming convex-concave on the surface of the reflective light coloring layer, making the refractive index difference of adjacent layers 0.1 or more, and further, making its average thickness thinner than the thickness of the transmissive light coloring layer. Therefore, it is possible to form a color filter for transflective type color liquid crystal display by simple processes in low cost.

In this embodiment, it is preferable that the reflective light coloring layer comprises a refractive index improving agent, which improves the refractive index, so that the difference of refractive index, between the reflective light coloring layer and a layer in contact with the surface of the convex-concave formed side of the reflective light coloring layer, is 0.1 or more. The reason for this is that, the refractive index of the reflective light coloring layer can be adjusted by adding a refractive index improving agent to the reflective light coloring layer. Therefore, a material selection will be wider since, in selecting a material for forming a layer in contact with the surface on the convex-concave formed side of the reflective light coloring layer, there is no need to select concerning the refractive index difference with respect to the reflective light coloring layer.

In this embodiment, it is preferable that the convex-concave on the surface of the reflective light coloring layer is composed of a plurality of concave portions formed by a curved surface on the surface of the reflective light coloring layer formed in the same thickness as the transmissive light coloring layer. When the convex-concave on the surface of the reflective light coloring layer composed of a plurality of concave portions formed by a curved surface, it is possible to form convex-concave more simply by carrying out a photolithography method. Further, since the average thickness of the reflective light coloring layer is easy to control, the thickness difference from the transmissive light coloring layer can be easily controlled. Therefore, the color tone of the reflective light and the transmissive light can be uniformalized relatively easily.

Further, in this embodiment, it is preferable that a layer in contact with the surface of the convex-concave formed side of the reflective light coloring layer is an optical route difference controlling layer for controlling an optical route difference between a reflective light region and a transmissive light region. Since the reflective light passes through the liquid crystal layer by twice length of the optical route of the transmissive light, it is necessary to control this optical route difference. Therefore, it is preferable that such an optical route difference controlling layer for controlling optical difference is formed on the reflective light coloring layer.

The fourth embodiment of the present invention provides color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, an optical route difference controlling layer, for controlling an optical route difference between a reflective light region and a transmissive light region, is formed on a surface of the convex-concave formed side of the reflective light coloring layer, and the optical route difference controlling layer comprises a refractive index improving agent, which improves a refractive index, so that a difference of the refractive index, between the reflective light coloring layer and the optical route difference controlling layer, is 0.1 or more.

In the present invention, by adding a refractive index improving agent to the optical route difference controlling layer, the refractive index of the optical route difference controlling layer can be improved easily. Therefore, in selecting a material for forming the optical route difference controlling layer, material selection will be wider. Resultantly, cost can be lowered.

In this embodiment, it is preferable that the convex-concave on the surface of the reflective light coloring layer is composed of a plurality of concave portions formed by a curved surface on the surface of the reflective light coloring layer formed in the same thickness as the transmissive light coloring layer. When the convex-concave on the surface of the reflective light coloring layer composed of a plurality of concave portions formed by a curved surface, it is possible to form convex-concave more simply by carrying out a photolithography method. Further, since the average thickness of the reflective light coloring layer is easy to control, the thickness difference from the transmissive light coloring layer can be easily controlled. Therefore, the color tone of the reflective light and the transmissive light can be uniformalized relatively easily.

In this embodiment, it is preferable that the convex-concave is formed on a surface of a liquid crystal layer side of the optical route difference controlling layer, and a refractive index difference between the optical route difference controlling layer and a layer in contact with the surface of the convex-concave formed side of the optical route difference controlling layer, is 0.1 or more. The reason for this is that, by this, a light scattering effect can be obtained also on the surface of the optical route difference controlling layer.

Further, in this embodiment, it is preferable that the convex-concave on the surface of the optical route difference controlling layer is composed of a plurality of concave portions formed by a curved surface on the surface of the optical route difference controlling layer. The reason for this is that such concave portions can be formed easily and its shape can be controlled relatively easily.

Furthermore, the fifth embodiment of the present invention provides color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, an optical route difference controlling layer, for controlling an optical route difference between a reflective light region and a transmissive light region, is formed on a surface of the convex-concave formed side of the reflective light coloring layer, and the convex-concave is formed also on a surface of a liquid crystal side of the optical route difference controlling layer, a optical route difference controlling layer flattening layer is formed on the surface of the convex-concave formed side of the optical route difference controlling layer to flatten the surface of the optical route difference controlling layer, and a difference of the refractive index, between the optical route difference controlling layer and the optical route difference controlling layer flattening layer, is 0.1 or more.

In this embodiment, by forming convex-concave on both of the surface of the reflective light coloring layer and on the surface of the optical route difference controlling layer, the light scattering effect can be obtained more effectively.

In this embodiment, it is preferable that the optical route difference controlling layer flattening layer comprises a refractive index improving agent, which improves a refractive index, so that the difference of the refractive index, between the optical route difference controlling layer and the optical route difference controlling layer flattening layer, is 0.1 or more. The reason for this is that, by adding the refractive index improving agent in the optical route difference controlling layer flattening layer, the refractive index difference between the optical route difference controlling layer and the optical route difference controlling layer flattening layer can be controlled easily. Moreover, the material selection will be wider since it is not necessary to consider the refractive index of the two layers when selecting a material for forming the two layers.

In this embodiment, it is preferable that the reflective light coloring layer also comprises a refractive index improving agent, which improves a refractive index. The reason for this is that, by adding the refractive index improving agent also to the reflective light coloring layer, it becomes easy to control the refractive index difference between the reflective light coloring layer and the optical route difference controlling layer and the refractive index difference between the optical route difference controlling layer and the optical route difference controlling layer flattening layer. Therefore, a material forming each layer can be selected without considering such refractive index difference. Consequently, the material selection will be wider and the cost can be lowered.

Further, in this embodiment, it is preferable that the convex-concave on the surface of the reflective light coloring layer is composed of a plurality of concave portions formed by a curved surface on the surface of the reflective light coloring layer formed in the same thickness as the transmissive light coloring layer. When the convex-concave on the surface of the reflective light coloring layer composed of a plurality of concave portions formed by a curved surface, it is possible to form convex-concave more simply by carrying out a photolithography method. Further, since the average thickness of the reflective light coloring layer is easy to control, the thickness difference from the transmissive light coloring layer can be easily controlled. Therefore, the color tone of the reflective light and the transmissive light can be uniformalized relatively easily.

Additionally, in this embodiment, it is preferable that the convex-concave on the surface of the optical route difference controlling layer is composed of a plurality of concave portions formed by a curved surface on the surface of the optical route difference controlling layer. The reason for this is that such concave portions can be formed easily and its shape can be controlled relatively easily.

Furthermore, the sixth embodiment of the present invention provides a color filter for transflective type color liquid crystal display comprising a transparent substrate and a reflective light coloring layer and a transmissive light coloring layer formed on the transparent substrate, wherein at least one removal portion is formed so that an average thickness of the reflective light coloring layer is thinner than the thickness of the transmissive light coloring layer, an optical route difference controlling layer, for controlling an optical route difference between a reflective light region and a transmissive light region, is formed on a surface of a liquid crystal layer side of the reflective light coloring layer, a convex-concave is formed on a surface of a liquid crystal layer side of the optical route difference controlling layer, and a refractive index difference between the optical route difference controlling layer and a layer in contact with the surface of the convex-concave formed side of the optical route difference controlling layer, is 0.1 or more.

In this embodiment, the refractive index difference from a layer in contact with the surface of the convex-concave formed side can be made 0.1 or more only by forming the convex-concave on the surface of the optical route difference controlling layer, which is necessary for controlling optical route difference, and the light scattering effect can be obtained at this part. Therefore, the color filter for transflective type color liquid crystal display can be obtained relatively easily.

In this embodiment, it is preferable that the optical route difference controlling layer comprises a refractive index improving agent, which improves a refractive index, so that a difference of the refractive index, between the optical route difference controlling layer and a layer in contact with the surface of the convex-concave formed side of the optical route difference controlling layer, is 0.1 or more. The reason for this is that, by comprising the refractive index improving agent, the refractive index difference from a layer in contact with the surface of the convex-concave formed side can be easily controlled to 0.1 or more. Therefore, selection of materials for forming the optical route difference controlling layer and the layer in contact with the surface of the convex-concave formed side is widened.

Further, in this embodiment, it is preferable that the convex-concave on the surface of the above mentioned optical route difference controlling layer is composed of a plurality of concave portions formed by a curved surfaces on the surface of the optical route difference controlling layer. The reason for this is that such concave portions can be formed easily and its shape can be controlled relatively easily.

The seventh embodiment of the present invention provides a color filter for transflective type color liquid crystal display comprising a transparent substrate and a reflective light coloring layer and a transmissive light coloring layer formed on the transparent substrate, wherein at least one removal portion is formed so that an average thickness of the reflective light coloring layer is thinner than the thickness of the transmissive light coloring layer, an optical route difference controlling layer, for controlling an optical route difference between a reflective light region and a transmissive light region, is formed on a surface of a liquid crystal layer side of the reflective light coloring layer, a convex-concave is formed on a surface of a liquid crystal layer side of the optical route difference controlling layer, a optical route difference controlling layer flattening layer is formed on the surface of the convex-concave formed side of the optical route difference controlling layer to flatten the surface of the optical route difference controlling layer, and a difference of the refractive index, between the optical route difference controlling layer and the optical route difference controlling layer flattening layer, is 0.1 or more.

By thus providing an optical route difference controlling layer flattening layer, a transparent electrode layer can be formed under successful conditions without causing disadvantages such as disconnection and the like, in forming the transparent electrode layer on the convex-concave formed side of the optical route difference controlling layer.

In this embodiment, it is preferable that the optical route difference controlling layer flattening layer comprises a refractive index improving agent, which improves a refractive index, so that a difference of the refractive index, between the optical route difference controlling layer and the optical route difference controlling layer flattening layer, is 0.1 or more. The same effect as in the above mentioned sixth embodiment can be obtained also by adding the refractive index improving agent to the optical route difference controlling layer flattening layer.

Further, in this embodiment, it is preferable that the convex-concave on the surface of the optical route difference controlling layer is composed of a plurality of concave portions formed by a curved surface on the surface of the optical route difference controlling layer. The reason for this is that such concave portions can be formed easily and its shape can be controlled relatively easily.

Further, the present invention provides a transflective color liquid crystal display comprising the color filter for transflective type color liquid crystal display according to any one of the above mentioned third to seventh embodiments.

According to the present invention, the cost can be lowered since a color filter for transflective type color liquid crystal display, which can be easily manufactured, is used.

BRIEF DESCRIPTION OF THE DRAWINGS

FIG. 11 is a view showing one example of an embodiment of the transflective type color filter in the present invention.

FIG. 12 is a view showing one example of a conventional transflective type color filter.

BEST MODES FOR CARRYING OUT THE INVENTION

The color filter for transflective type color liquid crystal display of the present invention and the transflective type color liquid crystal display using the same will be illustrated below.

The color filter for transflective type color liquid crystal display (hereinafter, referred to as transflective type color filter, in some cases) of the present invention can be classified into: a first embodiment using the transparent membrane pattern region as the reflective light region; a second embodiment using the transparent membrane pattern region as the transmissive light region; and five embodiments depending on a shape of the reflective light coloring layer and on a layer containing the refractive index improving agent. These will be described below.

The color filter for transflective type liquid crystal display of the present invention comprises a transparent membrane pattern region obtained by laminating: a transparent substrate; a transparent membrane pattern layer comprising a transparent membrane formed in a pattern on the transparent substrate; and a coloring layer formed so as to cover the transparent membrane pattern layer. In the color filter for transflective type liquid crystal display of the present invention, the coloring property of the reflective light region or the transmissive light region can be controlled, since the transparent membrane is formed a pattern on the transparent substrate. Resultantly, a color filter for transflective type liquid crystal display manifesting similar coloring property, in the reflective light region and in the transmissive light region, can be obtained.

Figure 1:
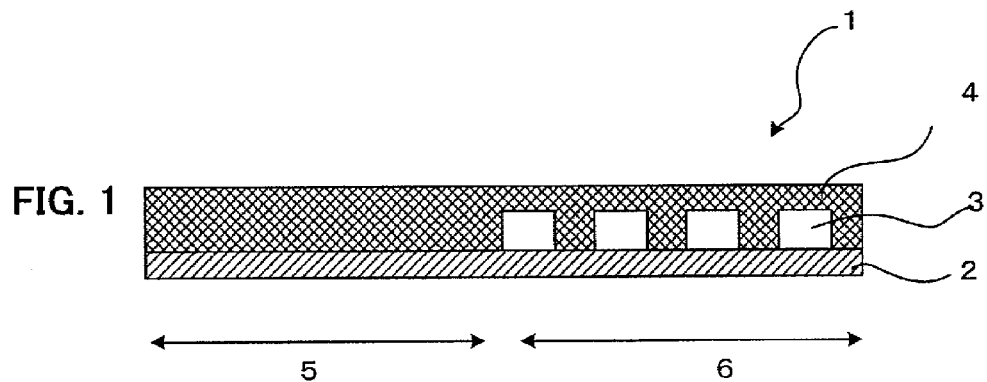
FIG. 1 is a view showing one example of the transflective type color filter in the present invention.

As an example of the first embodiment, in the color filter for transflective type liquid crystal display as shown in FIG. 1, the above mentioned transparent membrane pattern region, composed of a transparent membrane 3 formed in a pattern on a transparent substrate 2 and a coloring layer 4 formed thereon, can be used as a reflective light region 6 and a coloring layer region, comprising a coloring layer 4 formed on the transparent substrate 2, can be used as a transmissive light region 5.

Figure 2:
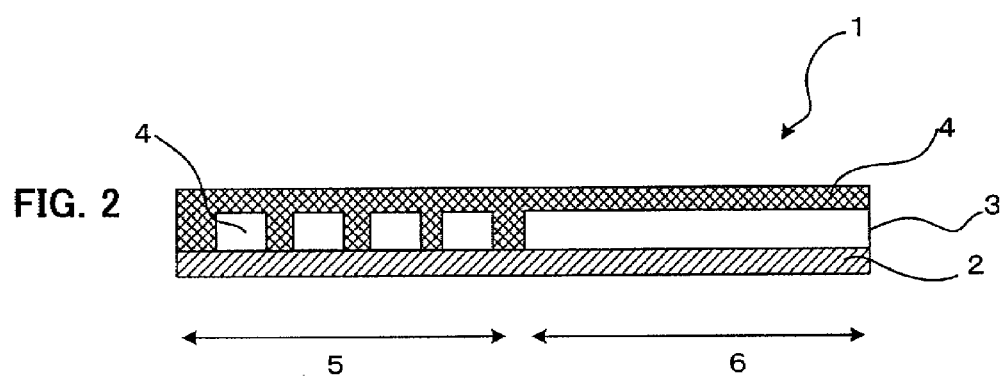
FIG. 2 is a view showing another example of the transflective type color filter in the present invention.

As an example of the second embodiment, in the color filter for transflective type liquid crystal display as shown in FIG. 2, the above mentioned transparent membrane pattern region, composed of a transparent membrane 3 formed in a pattern and a coloring layer 4 on a transparent substrate 2, can be used as a transmissive light region 5 and a transparent membrane uniform region, composed of a transparent membrane 3 and a coloring layer 4 formed on the whole surface, can be used as a reflective light region 6. These will be described below.

(1) First Embodiment

First, the first embodiment of the invention will be explained. The color filter for transflective type liquid crystal display in the first embodiment of the present invention composed of the above mentioned transparent membrane pattern region, comprising the transparent membrane formed in a pattern on the transparent substrate and the coloring layer formed thereon, and the above mentioned coloring layer region, comprising the coloring layer formed on the transparent substrate The above mentioned transparent membrane pattern region is used as the reflective light region and the above mentioned coloring layer region is used as the transmissive light region.

In this embodiment, since the transparent membrane pattern region used as the reflective light region has a pattern made of the transparent membrane, the color purity can be made pale as compared with a case in which light is transmitted through only the coloring layer. By this, the above mentioned coloring layer region having no transmissive light used as the transmissive light region, when outer light passes through the transparent membrane pattern region twice, can manifest the same coloring property as that in a case when the back light passes through once. This will be explained below.

1. Transparent Membrane Pattern Region

The transparent membrane pattern region in this embodiment is obtained by laminating the transparent substrate, the transparent membrane pattern layer comprising the transparent membrane formed in a pattern on the above mentioned transparent substrate, and the coloring layer formed so as to cover the above mentioned transparent membrane pattern layer.

These will be illustrated separately.

(Transparent Membrane)

First, the transparent membrane in this embodiment will be described. The transparent membrane in this embodiment is formed on the below described transparent substrate. Materials used as a protective membrane or a spacer in a color filter can be used, and the materials are not particularly limited as long as they are transparent materials.

Specific materials used as such the transparent membrane include photosensitive acrylic resins, photosensitive polyimides, positive resists, caldo resins, polysiloxanes, benzocyclobutene and the like.

In this embodiment, it is preferable that the transmittance spectral of the transparent membrane at wavelengths from 380 nm to 780 nm is 85% or more, particularly 95% or more. The reason for this is that, if the transmissive spectral of the transparent membrane is in the above mentioned range, the coloring property of the coloring layer described later is not likely to be influenced. Consequently, when it is used in the reflective light region in this embodiment, it is possible to further approximate the coloring property of the reflective light region and the coloring property of the transmissive light region.

Here, for measuring the transmissive spectral in this embodiment, a spectral photometry apparatus (MCPD-2000, manufactured by Otsuka Electronics Co., Ltd.) was used. A halogen lamp was used as a light source.

Further, in this embodiment, it is preferable that the thickness of the transparent membrane is in a range of 0.5 to 3.5 µm, particularly 1.0 to 2.5 µm. The reason for this is that if the thickness of the transparent membrane is in the above mentioned range, when the color filter for transflective type liquid crystal display in this embodiment is used in a transflective type liquid crystal display, it is possible to further approximate the coloring property of the above mentioned reflective light region and the coloring property of the above mentioned transmissive light region.

(Coloring Layer)

Next, the coloring layer will be described. The coloring layer in this embodiment is a layer formed on the transparent substrate described later or the transparent membrane described above, and materials thereof are not particularly limited as long as they are used as a general color filter or coloring layer. In general, the coloring layer used in the color filter for the liquid crystal display includes three primary colors of red (R), blue (B) and green (G), and shape, method for manufacturing and the like are the same for each color in this embodiment.

The material of a general coloring layer is constituted of a pigment, binder, additives and the like. The kind of the above mentioned binder varies depending on a method for manufacturing the coloring layer. Materials required in a pigment dispersion method are suitably used since the coloring layer is generally formed by the pigment dispersion method.

(Transparent Substrate)

Next, the transparent substrate in this embodiment will be described. The transparent substrate used in this embodiment is a substrate on which the transparent membrane pattern layer and the coloring layer are formed, and the substrate is not particularly limited as long as it is conventionally used in a color filter. For example, transparent rigid materials having no flexibility such as quartz glass, synthetic quartz and the like, or transparent flexible materials having flexibility such as transparent resin films, optical resin plates and the like can be used. As the transparent substrate, those subjected to surface treatments, if necessary, to prevent alkali elution, to impart gas barrier property, or for other purposes may be used.

(Transparent Membrane Pattern Region)

Next, the transparent membrane pattern region in this embodiment will be described. The transparent membrane pattern region in this embodiment is a region having the transparent membrane pattern layer, comprising the above mentioned transparent membrane formed in a pattern on the above mentioned transparent substrate, and the above mentioned coloring layer formed on the entire surface, so as to cover the transparent membrane pattern layer.

Figure 3:
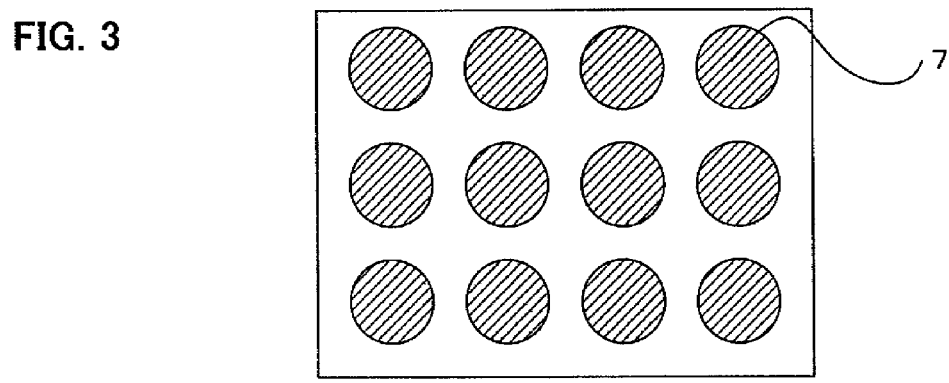
FIG. 3 is a view showing one example of a pattern of a transparent membrane in a transparent membrane pattern region in the present invention.
Figure 4:
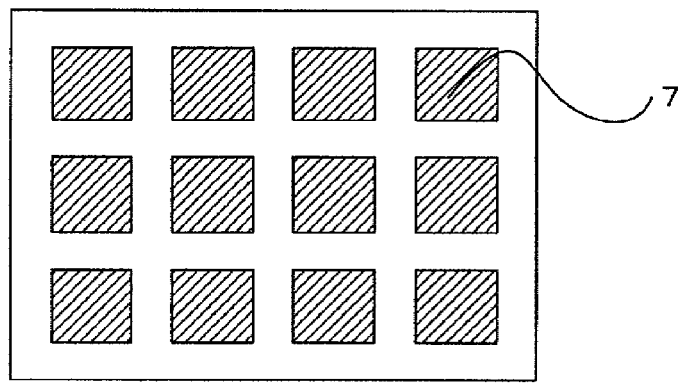
FIG. 4 is a view showing another example of a pattern of a transparent membrane in a transparent membrane pattern region in the present invention.
Figure 5:
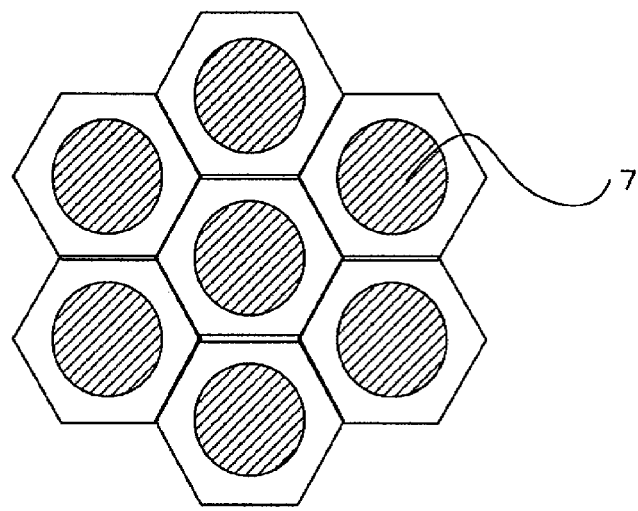
FIG. 5 is a view showing another example of a pattern of a transparent membrane in a transparent membrane pattern region in the present invention.
Figure 6:
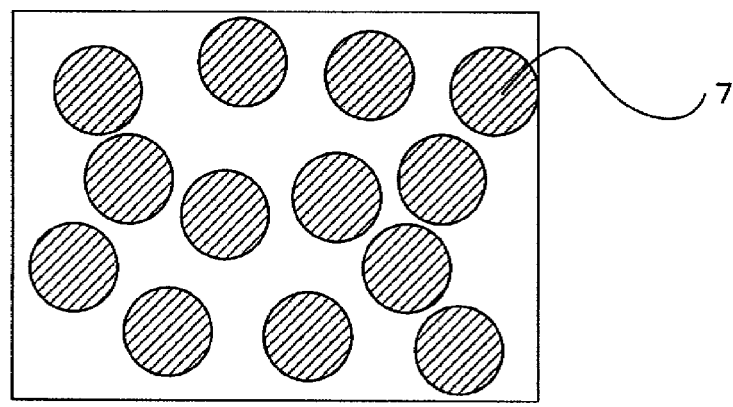
FIG. 6 is a view showing another example of a pattern of a transparent membrane in a transparent membrane pattern region in the present invention.

The shape of a pattern of the transparent membrane pattern layer 7 in this embodiment may be, for example, in the form of circle as shown in FIG. 3 or a rectangle as shown in FIG. 4. Moreover, the pattern, for example, may be arranged uniformly, closest packed as shown in FIG. 5 or randomly arranged as shown in FIG. 6, and is not particularly limited.

The pattern of the transparent membrane in this embodiment includes: a pattern composed of island shaped transparent membrane; and a pattern composed of pore portions formed, in a pattern, in the transparent membrane. The shape of these patterns is appropriately selected depending on the apparatus, conditions and the like in manufacturing. Here, it is more preferable that the island shaped parts or pore portions of the transparent membrane pattern layer are the form of cylinder. Since the island formed parts or pore portions are in the form of the cylinder, formation of the patter is easy, and area and the like can be controlled easily.

It is preferable that the pattern in this embodiment is composed of the transparent membrane pattern layer randomly formed. The reason for this is that since the transparent membrane pattern region is randomly formed, interference of the phase of transmitted light does not occur.

In the transparent membrane pattern region as described above, the transparent membrane pattern layer is formed of a transparent membrane. Therefore, the color purity can be made pale as compared with a layer made only of the coloring layer.

2. Coloring Layer Region

The coloring layer region in this embodiment will be described. The coloring layer region in this embodiment is a region in which the above mentioned coloring layer is uniformly formed, on the entire surface, on the above mentioned transparent substrate.

The coloring layer region in this embodiment, since the coloring layer is formed on the transparent substrate, has the same constitution as that of the coloring layer in a usual color filter for reflective type liquid crystal display or a color filter for transmissive type liquid crystal display.

The coloring layer in the coloring layer region is formed simultaneously with the coloring layer in the above mentioned transparent membrane pattern region. By this, the number of processes for manufacturing the transflective type color filter in this embodiment can be reduced.

3. Color Filter for Transflective Type Liquid Crystal Display

The color filter for transflective type liquid crystal display in this embodiment will be described. The color filter for transflective type liquid crystal display in this embodiment has the above mentioned transparent membrane pattern region and the coloring layer region. Its shape and the like are not particularly limited as long as it uses the transparent membrane pattern region as the reflective light region and the coloring layer region as the transmissive light region. Pixels exhibiting three primary colors of red (R), green (G) and blue (B) may be arranged in the form of stripes or stagger or the like.

In this embodiment, since the above mentioned transparent membrane pattern region has the pattern of a transparent membrane, the color purity can be made pale as compared with transmissive light passed through only the coloring layer. Also when outer light passes through the above mentioned transparent membrane pattern region twice, the same coloring property can be obtained as in the case of the back light passing through the above mentioned coloring layer once.

(Method for Manufacturing)

The method for manufacturing the color filter for transflective type liquid crystal display in this embodiment will be described. The method for manufacturing the color filter for transflective type liquid crystal display in this embodiment is not particularly limited as long as it is a method capable of forming the above mentioned transparent membrane pattern region and coloring layer region. In this embodiment, it is preferable that, the pattern, particularly of the transparent membrane, is manufactured by photolithography from the standpoint of precision and the like.

First, a process of forming a pattern layer, made of the transparent membrane, on the transparent substrate in a transparent membrane pattern region is carried out. In this process, for example, a transparent membrane forming coating solution is prepared by dissolving the above mentioned photosensitive transparent membrane forming resin in a solvent, and this coating solution is uniformly coated by a spin coating method and the like. After drying the coating solution, a pattern exposure is carried out to obtain a required pattern. Then, developed, and the like, thereby forming the transparent membrane pattern.

Subsequently, a process of forming the coloring layer in the coloring layer region and the transparent membrane pattern region is carried out. Conventionally used method such as a pigment dispersing method, a printing method by an ink jet and the like can be adapted to the present process, and is not particularly limited in the present invention.

When the manufacture of the color filter for transflective type liquid crystal display in this embodiment is carried out by the photolithography, since the color filter can be manufactured by 4 processes, including usual processes for manufacturing the color filter and processes for forming the transparent membrane, formation is easy as compared with a constitution of forming separate color filters, and the like.

(Others)

The transflective type color filter in this embodiment may have, if necessary, a black matrix and other layers, for example, a transparent electrode layer, polarization layer and the like. The position of formation and materials of these layers are the same as those of conventional layers. Therefore, descriptions thereof are not repeated here.

(2) Second Embodiment

The second embodiment in the present invention is a color filter for transflective type liquid crystal display comprising a transparent membrane pattern region, composed of a transparent membrane and a coloring layer, and a transparent membrane uniform region, composed of a transparent membrane and a coloring layer, on a transparent substrate. The above mentioned transparent membrane pattern region is used as a transmissive light region and the above mentioned transparent membrane uniform region is used as a reflective light region.

In the above mentioned transparent membrane uniform region in this embodiment, the transparent membrane is formed uniformly on the entire surface. Therefore, in the above mentioned transparent membrane uniform region, an influence by the transparent membrane is larger as compared with the above mentioned transparent membrane pattern region, and the color purity when light is transmitted can be made pale. By this, when back light passes through the transparent membrane pattern region once and when outer light passes through the color filter in the transparent membrane uniform region twice, similar coloring property can be obtained. And by using the above mentioned transparent membrane uniform region as the reflective light region and the transparent membrane pattern region as the transmissive light region, the same coloring property can be obtained in the transmissive light region and the reflective light region.

Further, since the transparent membrane is provided on the above mentioned transparent substrate in the transparent membrane uniform region, when the coloring layer is formed on the transparent membrane, the thickness thereof can be made equal to the thickness of the transparent membrane pattern region having a pattern on the above mentioned transparent substrate. These will be explained below. Here, the transparent membrane, coloring layer and transparent substrate in this embodiment are the same as in the first embodiment. Therefore, explanations thereof are not repeated.

1. Transparent Membrane Pattern Region

The transparent membrane pattern region in this embodiment is obtained by laminating the transparent substrate, a transparent membrane pattern layer composed of the transparent membrane formed in a pattern on the above mentioned transparent substrate, and the coloring layer formed so as to cover the above mentioned transparent membrane pattern layer. The constituent materials and the like thereof are the same as in the first embodiment. Therefore, descriptions thereof are not repeated here.

2. Transparent Membrane Uniform Region

The transparent membrane uniform region in this embodiment will be described. The transparent membrane uniform region in this embodiment is a region comprising the transparent membrane uniformed layer, which is the above mentioned transparent membrane formed uniformly on the entire surface of the above mentioned transparent substrate, and the coloring layer formed uniformly on the transparent membrane uniform layer. Here, the thickness of the transparent membrane uniform layer is the same as the thickness of the transparent membrane in the above mentioned transparent membrane pattern layer.

By formation of the above mentioned transparent membrane uniform layer on the transparent substrate, an influence by the transparent membrane can be increased as compared with the above mentioned transparent membrane pattern region. Therefore, it is possible to further approximate the coloring property when back light passed through the above mentioned transparent membrane pattern region once and the coloring property when outer light passed through the above mentioned transparent membrane uniform region twice.

3. Transflective Type Color Filter

The color filter for transflective type liquid crystal display in this embodiment will be described. A shape and the like of the transflective type color filter in this embodiment is not limited as long as the above mentioned transparent membrane pattern region is used as the transmissive light region and the above mentioned transparent membrane uniform region is used as the reflective light region. Pixels exhibiting three primary colors of red (R), green (G) and blue (B) may be arranged in the form of stripes, stagger or the like, and its shape and the like are not particularly limited.

In this embodiment, since the transparent membrane is formed uniformly on the entire surface in the above mentioned transparent membrane uniform region, when back light passed through the transparent membrane pattern region once and when outer light passed through the transparent membrane uniform region twice, similar coloring property can be obtained. By this reason, by using the above mentioned transparent membrane uniform region as the reflective light region and the above mentioned transparent membrane pattern region as the transmissive light region, it is possible to further approximate the coloring property in the transmissive light region and the coloring property in the reflective light region.

Since the transparent membrane is formed on the entire surface in the transparent membrane uniform region, it is possible to make the thickness of the transparent membrane uniform region equal to the thickness of the transparent membrane pattern region.

Figure 7:
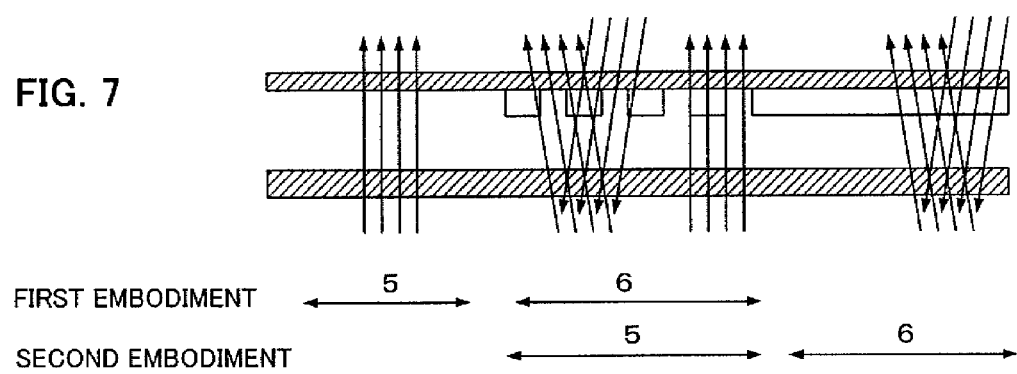
FIG. 7 is a view showing one example of a light transmissive route of the transflective type color filter in the present invention.

Here, in the first embodiment, as shown in FIG. 7, since the transparent membrane pattern layer is used as a reflective light region 6, outer light passes through the transparent membrane pattern layer twice. Therefore, in designing a color filter, for example, a case in which incidence light does not passes through the transparent membrane and reflective light passes through the transparent membrane, and other cases should be taken into consideration, leading to a complicated event in some cases. In this regard, since this embodiment uses the transparent membrane pattern region as a transmissive light region 5, only back light passes through the pattern region. As a result, an optimum value of each constitution of a pattern region can be optimized easily by simulation. The optimum value of each constitution obtained by simulation in this embodiment will be described below.

(Optimization by Simulation)

The simulation in this embodiment will be described. Simulation was carried out with a pattern composed of pore portions arranged in the form of cylinder in the transparent membrane.

Figure 8:
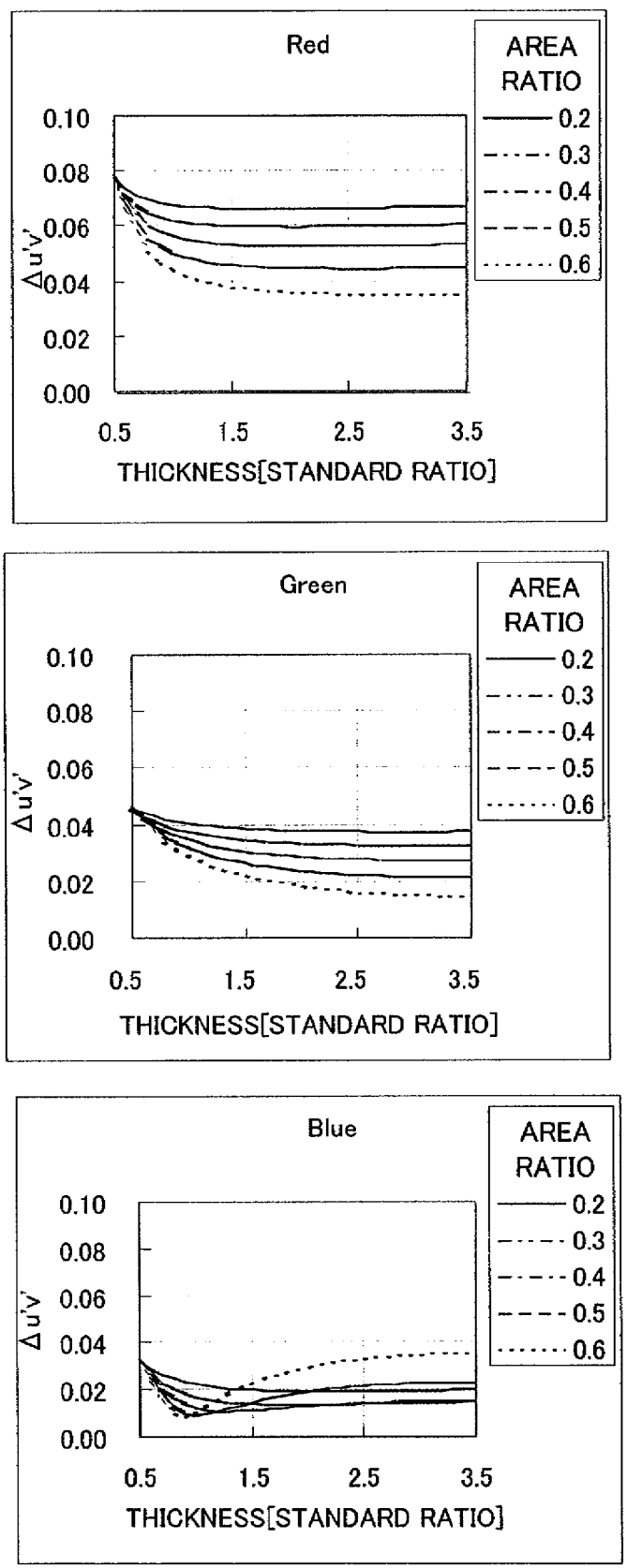
FIG. 8 is a view showing one example of simulation for detecting the optimum value of the transflective type color filter in the present invention.

FIG. 8 is a graph showing thickness and Δu'v' at each area ratio in each coloring layer. Here, Δu'v' is a value showing a color difference of the transparent membrane pattern region and the transparent membrane uniform region, and calculated as follows:

$$\sqrt{(u_{T'}-u_{R'})^2+(v_{T'}-v_{R'})^2}$$

wherein transmissive light region u'v' chromaticity value is $(u_{T'}, v_{T'})$ and reflective light region u'v' chromaticity value is $(u_{R'}, v_{R'})$.

Figure 9:
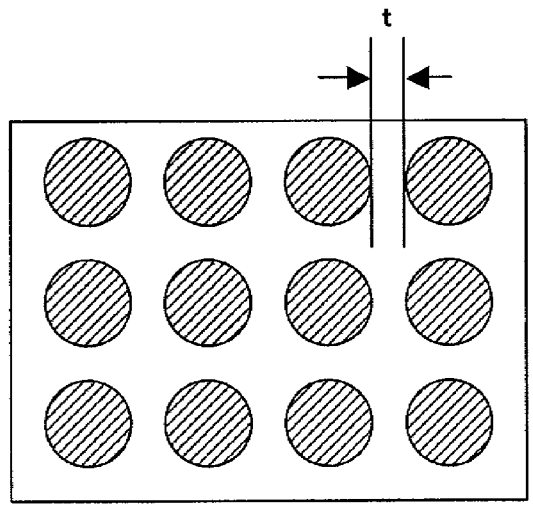
FIG. 9 is a view showing one example of a pattern of a transparent membrane in a transparent membrane pattern region in the present invention.

The minimum value of Δu'v' shows the minimum difference in coloring property of the transparent membrane pattern region and the transparent membrane uniform region, and can be read from FIG. 8. As apparent from FIG. 8, blue shows remarkable variation in the value of Δu'v' depending on thickness, and for red and green, variation in Δu'v' depending on thickness is small. Therefore, it is preferable that the optimum value is determined from blue. Here, the area ratio, as shown in FIG. 9, is calculated from the diameter of the cylinder pattern and the distance "t" between patterns. However, as apparent from FIG. 8, the smaller the area ratio of the transparent membrane formed region in the transparent membrane pattern region is, the smaller the value of Δu'v'.

Figure 10:
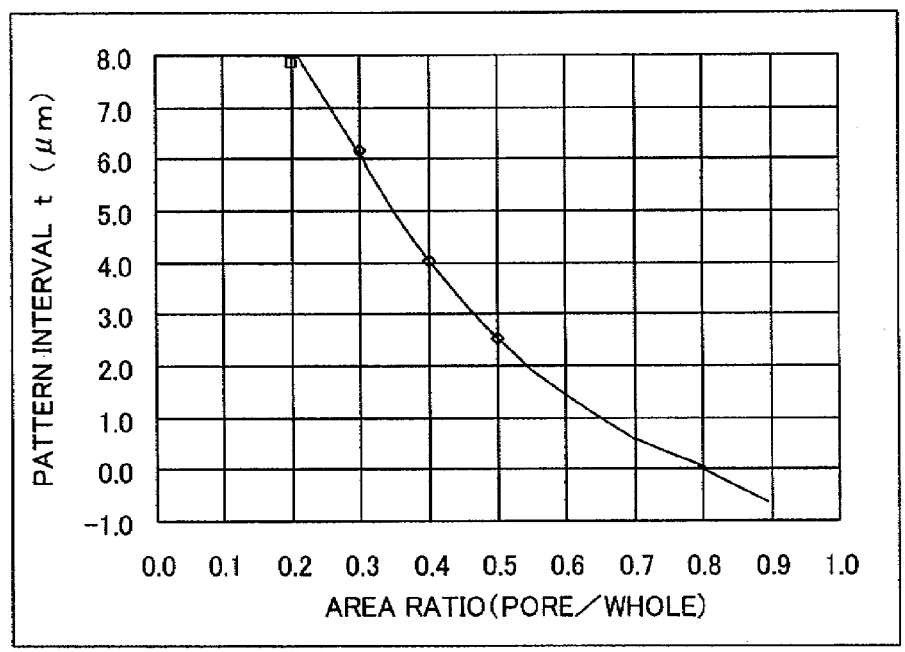
FIG. 10 is a view showing an area ratio of transparent membrane pattern regions on the whole in the present invention.

Regarding the minimum diameter of the cylinder pattern and the distance "t" between patterns in FIG. 9, it is suitable from the standpoints of current technology, cost and the like that the diameter is 10 μm and the distance "t" between patterns is 4.0 μm. FIG. 10 shows the relation between the distance "t" between patterns and the area ratio, when the diameter is 10 μm. By this, when the diameter is 10 μm and the distance "t" between patterns is 4.0 μm, the area ratio is calculated to be 0.4. And by this, when a blue coloring layer is used and the area ratio is 0.4, the thickness when Δu'v' is minimum can be determined to be 1.3 from a graph of blue color in FIG. 8.

Here, the thickness in this simulation is a value represented by ratio of the thickness, of the sum of the transparent membrane and the coloring layer, when the thickness in the case of using the above mentioned coloring layer composed only of the coloring layer in the transmissive light region is 1.

From the above mentioned matters, it is preferable that the value of area ratio of a region, where the transparent membrane is formed, in the above mentioned transparent membrane pattern region (transparent membrane formatting area/transparent membrane pattern region area) is in a range of 0.3 to 0.5, particularly 0.35 to 0.45. Here, the transparent membrane forming area is an area where the transparent membrane is formed in the transparent membrane pattern region.

It is preferable the thickness of the transparent membrane forming the transparent membrane pattern layer and the above mentioned transparent membrane uniform layer is in a range of 0.5 to 3.0, particularly 1.1 to 1.4, specifically 1.25 to 1.35 when the thickness of the coloring layer, in a case where the coloring layer composed only of the above mentioned coloring layer is used in the transmissive light region, is 1.

(Method for Manufacturing)

The method for manufacturing the color filter for transflective type liquid crystal display in this embodiment is the same as in the first embodiment. Therefore, the description thereof is not repeated.

(Others)

The color filter for transflective type liquid crystal display in this embodiment may have, if necessary, a black matrix and other layers, for example, a transparent electrode layer, polarization layer and the like. The position of formation and materials of these layers are the same as those of conventional layers. Therefore, descriptions thereof are omitted here.

(3) Transflective Type Liquid Crystal Display

Next, the transflective type liquid crystal display in the present invention will be described. The present invention provides a transflective type liquid crystal display comprising the above mentioned color filter for transflective type liquid crystal display.

In the present invention, by comprising the above mentioned color filter for transflective type liquid crystal display, it is possible to further approximate the coloring property of a color image by transmissive light display and the coloring property of a color image by reflective light display.

The transflective type liquid crystal display in the present invention is a transflective type liquid crystal display using the above mentioned transflective type color filter, and is not particularly limited as long as it comprises: the above mentioned transflective type color filter, an array substrate facing this color filter; the above mentioned color filter and the above mentioned array substrate; a liquid crystal layer enclosed in between the above mentioned color filter and the above mentioned array substrate; and on the array substrate, a part with a reflective membrane made of an aluminum membrane, silver membrane and the like placed in pixels and a part without the membrane placed, each having a reflective region and a transmissive region.

(4) Third Embodiment

The third embodiment of the transflective type color filter of the present invention is an embodiment having a convex-concave on a surface of a reflective light coloring layer. By thus forming the convex-concave on the surface of the reflective light coloring layer, the average thickness of the reflective light coloring layer is made thinner than the thickness of a transmissive light coloring layer.

Namely, the third embodiment of the present invention is a color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, and a refractive index difference between the reflective light coloring layer and a layer in contact with the surface of the convex-concave formed side of the reflective light coloring layer, is 0.1 or more.

In this embodiment, since the convex-concave is formed on the surface of the reflective light coloring layer and a refractive index improving agent is added to the reflective light coloring layer so that the refractive index difference from an adjacent layer is 0.1 or more, there is a merit that a light scattering effect can be obtained by this convex-concave on the surface of the reflective light coloring layer. And at the same time, since the average thickness of the reflective light coloring layer is thinner than the thickness of the transmissive light coloring layer, the color tones of the both layers can be controlled simultaneously. Further, a refractive index improving agent can also be used. By this, refractive index difference from an adjacent layer can be obtained easily. Therefore, there is a merit that a material selection of an adjacent layer can be widened.

Figure 13:
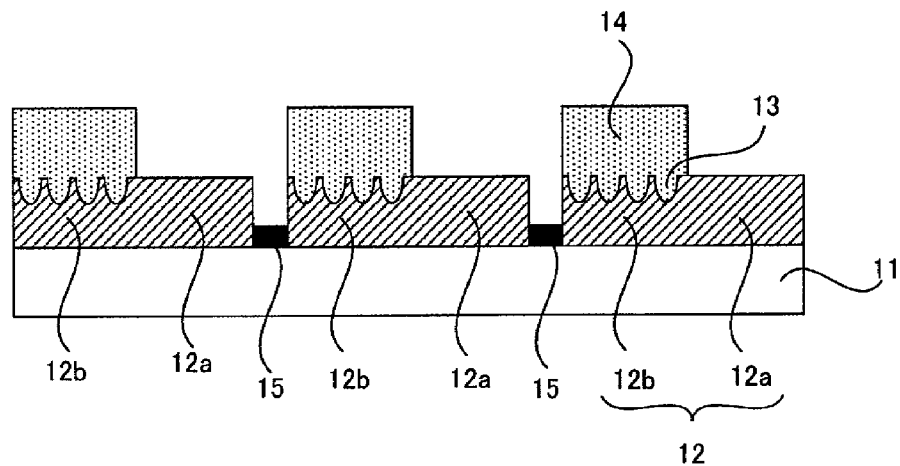
FIG. 13 is a schematic sectional view showing one example of the transflective type color filter in the present invention.

FIG. 13 shows one example of such a transflective type color filter of this embodiment, and on a transparent substrate 11, a coloring layer 12, composed of a transmissive light coloring layer 12a and a reflective light coloring layer 12b, is formed. On the surface of its liquid crystal layer side of the above mentioned reflective light coloring layer 12b, namely, on the surface opposite to the transparent substrate 11, a plurality of concave portions 13 are formed in a form of a pin hole.

Here, the refractive index improving agent may be added to the above mentioned transmissive light coloring layer 12a and the reflective light coloring layer 12b. The layers are formed of the same material, and on the surface of the reflective light coloring layer 12b, the concave portions 13 are formed in the form of a pin hole by the photolithography method. Further, on the surface of the above mentioned reflective light coloring layer 12b, an optical route difference controlling layer 14, for controlling optical difference between reflective light and transmissive light in a liquid crystal layer, is provided. Moreover, in between the coloring layers 12, a black matrix 15 is formed.

Thus, by forming the concave portions 13 in the form of a pin hole on the surface of the reflective light coloring layer 12b, it is possible to decrease the average thickness of the entire body of the reflective light coloring layer 12b. By controlling the size and depth of this concave portion 13 in the form of pin hole, the light transmittance of the transmissive light coloring layer and the light transmittance of the reflective light coloring layer can be controlled, consequently, the color tones of the both layers can be made similar.

The reflective light coloring layer 12b having this concave portion 13 in the form of a pin hole may be a layer having high refractive index containing the refractive index improving agent added. In this case, the material selection of an adjacent optical route difference controlling layer 14 is extremely wide, and even if a usually used material is used, the refractive index difference can be 0.1 or more. By thus controlling the refractive index difference to be 0.1 or more, the light scattering effect can be obtained. Namely, when incident light enters into a region of the concave portion 13 in the form of a pin hole formed of curved surfaces, if there is a predetermined refractive index difference between the reflective light coloring layer 12b and the optical route difference controlling layer 14, the incident light is refracted at a predetermined angle at the interface between the both layers. Therefore, at the concave portion 13 formed of curved surfaces, the incident light goes out at various angles. By this, the light scattering effect can be obtained.

Thus, simply by forming the concave portion 13 on the surface of the reflective light coloring layer 12b, control of the color tone with the transmissive light is possible. And further, the light scattering effect in the reflective light region can be obtained. Therefore, a transflective type color filter can be obtained by simple processes, and the cost can be lowered.

Such a transflective type color filter of this embodiment will be described separately by each component.

1. Coloring Layer

The coloring layer used in this embodiment is formed on the transparent substrate, and is composed of the reflective light coloring layer and the transmissive light coloring layer. The coloring layer referred to in this embodiment is composed of pixel parts of a plurality of colors, usually, pixel parts of three colors of red (R), green (G) and blue (B), and formed of various patterns, for example, in a form of a mosaic, triangle, stripe and the like.

(Reflective Light Coloring Layer)

The characteristics of the reflective light coloring layer in this embodiment is that the convex-concave is formed on the surface of its liquid crystal layer side and the average thickness thereof is thinner than the thickness of the above mentioned transmissive light coloring layer.

a. Convex-Concave on Surface

First, the convex-concave will be described. The shape of the convex-concave formed on the surface of the reflective light coloring layer is not particularly limited as long as it is a shape by which incident light is refracted and goes out toward various directions due to the refractive index difference described later. However, to make the incident light to go out toward various directions, it is preferable that the above mentioned convex-concave is composed of curved surfaces.

In this embodiment, it is preferable that convex-concave is provided by forming the concave portions on the surface of the plane formed reflective light coloring layer. The reason for this is that when the convex-concave is thus formed by forming concave portions on the surface in the form of a plane, the concave portions can be formed simply in one process by a simple method such as photolithography method and the like. And the average thickness can be controlled easily by the size of concave portions. Consequently, the color tones of the transmissive light region and the reflective light region can also be controlled easily.

Particularly, in this embodiment, it is preferable that the convex-concave on the surface of the reflective light coloring layer is composed of a plurality of concave portions formed by a curved surface on the surface of the reflective light coloring layer formed in the same thickness as the transmissive light coloring layer. By forming a uniform coloring layer and by forming a plurality of concave portions formed by curved surfaces by the photolithography method and the like only on its reflective light region, the reflective light coloring layer having the convex-concave and transmissive light coloring layer can be obtained extremely easily. Further, the color tones of the transmissive light region and the reflective light region can be controlled easily as described above.

In such concave portions, it is preferable that regions, wherein angles against the surface of the transparent substrate are within a predetermined range, occupy significant area for obtaining the light scattering effect. Specifically, regions having inclined angles within a range of 4° to 90° against the surface of the transparent substrate occupy preferably 40% or more, and in particular, nearer to 100%, more preferable.

Figure 27A:
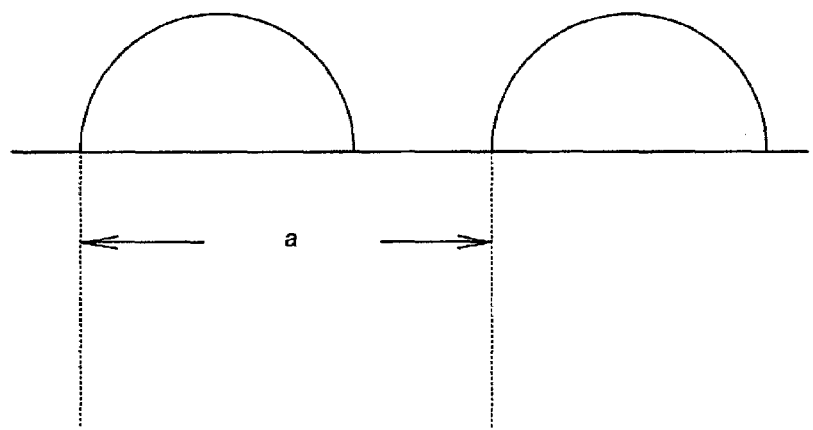
FIGS. 27A and 27B are schematic views showing examples of a pitch between adjacent concave portions in concave portions in the present invention.
Figure 27B:
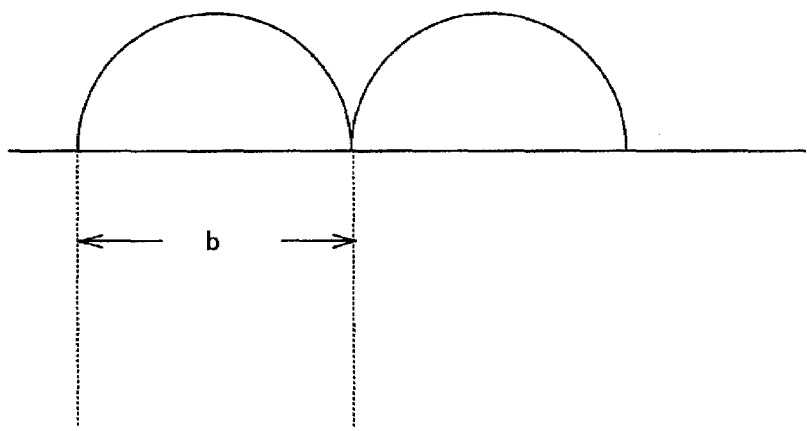

Regarding the above mentioned concave portions, as shown in FIGS. 27A and 27B, when a clearance is provided in between adjacent concave portions, "a" shown in FIG. 27A is referred to a one pitch. On the other hand, when a clearance is not provided in between adjacent concave portions, "b" shown in FIG. 27B is referred to as one pitch. Thus, a region having angles, against the surface of the transparent substrate, within the above mentioned range is defined.

b. Average Thickness

In this embodiment, by forming the above mentioned convex-concave and thus making the average thickness of the reflective light coloring layer thinner than the thickness of the transmissive light coloring layer, the color tone in the reflective light region and the color tone in the transmissive light region are controlled.

In this case, the average thickness of the reflective light coloring layer is made thinner than the thickness of a transmissive light coloring layer, to control the color tone of the reflective light region and the color tone of the transmissive light region. The difference in thickness in this case is determined so as to give optimum value depending on the property of each color liquid crystal display, the kind of a contained pigment or the like. Specifically, it is preferable that the average thickness of the reflective light coloring layer is in a range of 0.4 to 0.95, particularly in a range of 0.45 to 0.75 when the thickness of the transmissive light coloring layer is 1. The reason for this is that, within the above mentioned range, the color tone of the reflective light region and the color tone of the transmissive light region are approximately the same, and a transflective type color liquid crystal display of excellent quality can be obtained.

The specific value of the average thickness of the reflective light coloring layer is the same as a general transflective type color filter, and is within a range of 0.5 μm to 3 μm.

Control of the average thickness of the reflective light coloring layer in such a case can be carried out easily by changing the shape of the convex-concave. However, when the convex-concave is formed by forming concave portions on the plane formed reflective light coloring layer as described above, the average thickness can be controlled easily by controlling the depth of the concave portion, the size of the concave portion and the like. That is, being preferable.

c. Refractive Index

The refractive index of the reflective light coloring layer in this embodiment may advantageously be a refractive index so that the refractive index difference from a layer in contact with the surface of the convex-concave formed side is 0.1 or more. Refractive index can also be increased by adding the refractive index improving agent. By this, the refractive index is made that the refractive index difference from a layer in contact with the surface of the convex-concave formed side is 0.1 or more. The reason for this is that, by providing the refractive index difference as described above, incident light to the convex-concave of the reflective light coloring layer is refracted and goes out toward various directions. Consequently, the light scattering effect can be obtained.

In this embodiment, it is preferable that the above mentioned refractive index difference from a layer in contact with the surface of the convex-concave formed side is 0.2 or more, particularly 0.3 or more. The refractive index of the reflective light coloring layer can be controlled by the refractive index improving agent. The reason for this is that the light scattering effect can further be obtained and excellent display quality can be obtained in the reflective light region.

Though the refractive index of the reflective light coloring layer is not particularly limited, usually, the refractive index of the reflective light coloring layer may be such that the refractive index difference from a layer in contact with the surface of the convex-concave formed side is 0.1 or more. And in general, the refractive index of the reflective light coloring layer formed by using an acrylic resin is in a range of 1.49 to 1.50. For obtaining the refractive index difference from an adjacent layer, the above mentioned range is preferable, and when the refractive index improving agent is added, the above mentioned range is preferable since there is a limitation to addition of the refractive index improving agent.

In this embodiment, the above mentioned layer, in contact with the surface of the convex-concave formed side of the reflective light coloring layer, may be any one of an optical route difference controlling layer, flattening layer, liquid crystal layer and the like described later.

d. Materials

The materials for forming the reflective light coloring layer in this embodiment is not particularly limited as long as the material can be patterned, allows transmissive of light of a predetermined wavelength, and has a predetermined refractive index. Usually, those obtained by dispersing a pigment in an acrylic UV-curing resin used in a so-called pigment dispersion method are used.

When the refractive index improving agent is added, the refractive index improving agent is added to a material usually used for a coloring layer. Here, the refractive index improving agent is not particularly limited as long as it is a substance which increases the refractive index of a material by addition thereof, and specific examples include titanium oxide fine particles, zinc oxide, zirconia, tin oxide, aluminum oxide and the like.

It is preferable that such a refractive index improving agent is added in an amount of 1 part by weight to 70 parts by weight, particularly preferably in an amount of 10 parts by weight to 50 parts by weight, based on 100 parts by weight of solid components in the reflective light coloring layer. When the addition amount is smaller than the above mentioned range, it is not preferable that an effect of increasing refractive index by addition may not be sufficient, and when added over the above mentioned range, it is not preferable that deficiencies such as patterning failure and the like possibly occur.

(Transmissive Light Coloring Layer)

Though the transmissive light coloring layer in this embodiment is not particularly limited, usually, it is preferable that the transmissive light coloring layer is made of the same material as the reflective light coloring layer, from the standpoint of simplification of a process.

Such thickness of the transmissive light coloring layer is not particularly limited as long as it is thicker than the above mentioned average thickness of the reflective light coloring layer having the convex-concave on the surface, and specifically, in a range of 0.5 μm to 3 μm.

2. Optical Route Difference Controlling Layer (Flattening Layer)

In this embodiment, it is preferable that a flattening layer, for flattening a convex-concave formed surface side of the above mentioned reflective light coloring layer, is formed. The reason for this is that the surface in contact with a liquid crystal layer is usually preferably a plane, to make alignment of the liquid crystal in the liquid crystal display easy, and preferably a plane from the standpoint of prevention of breakage of a transparent electrode layer usually formed on the surface of the above mentioned coloring layer.

Such a flattening layer is preferably an optical route difference controlling layer having a function of controlling an optical route difference of beams in a liquid crystal layer in the reflective light region and the transmissive light region due to this flattening layer has a predetermined thickness. Usually, since reflective light in the reflective light region passes through the liquid crystal layer in an optical route length twice of the transmissive light in the transmissive light region, it is necessary to control this optical route difference. Therefore, it is preferable to form such an optical route difference controlling layer for controlling optical difference as described above.

(Refractive Index)

In this embodiment, it is preferable that such an optical route difference controlling layer or flattening layer is formed of a material having refractive index differing significantly from the refractive index of the above mentioned reflective light coloring layer. The reason for this is that, since the above mentioned optical route difference controlling layer or flattening layer is a layer in contact with the surface of the convex-concave formed side of the above mentioned reflective light coloring layer, when the optical route difference controlling layer or flattening layer is formed of a material having refractive index differing significantly from the above mentioned reflective light coloring layer, an excellent light scattering effect can be obtained on the convex-concave formed surface of the above mentioned reflective light coloring layer.

Such refractive index difference may be the refractive index higher than that of the above mentioned reflective light coloring layer or the refractive index lower than that of the above mentioned reflective light coloring layer.

When higher than the above mentioned reflective light coloring layer, specifically, it is necessary that the refractive index is higher than the refractive index of the above mentioned reflective light coloring layer by 0.1 or more, and it is preferable that the layer is formed with a material having refractive index higher by 0.2 or more, particularly 0.3 or more.

As such material, specifically, materials such as Photoneath UR4144 (manufactured by Toray Industries, Inc.), poly(thio)urethane resin, polysulfide resin, polyvinyl resin, allyl diglycol carbonate resin, poly(thio) ester resin, epoxy, polyether resins and the like can be used.

On the other hand, when lower than the refractive index of the above mentioned reflective light coloring layer, specifically, it is necessary that the refractive index is lower by 0.1 or more than the refractive index of the above mentioned reflective light coloring layer, and it is preferable that the layer is formed with a material having refractive index lower by 0.2 or more, particularly 0.3 or more.

As such material, specifically, materials such as Opstar JN series (manufactured by JSR Corporation) and the like can be used.

When the refractive index improving agent is used, a layer having relatively low refractive index is preferable in view of a fact that the above mentioned reflective light coloring layer has higher refractive index by addition of the refractive index improving agent. Specifically, it is necessary that the refractive index is lower by 0.1 or more, preferably 0.2 or more, particularly 0.3 or more than the refractive index of the above mentioned reflective light coloring layer. Further, it is preferable that the refractive index of the optical route difference controlling layer or flattening layer in this embodiment is in a range of 1.2 to 1.5, particularly 1.3 to 1.5.

(Thickness)

The thickness of the above mentioned optical route difference controlling layer is not particularly limited as long as it is capable of controlling optical route difference. Though it varies significantly depending on the thickness of the liquid crystal layer and the like, usually, it is preferable that the thickness is in a range of 0.5 μm to 3.5 μm, particularly in a range of 1.0 μm to 2.5 μm.

The thickness when the flattening layer only intending to flatten, particularly not intending to control the optical route difference, is preferably a thickness so that a difference from the transmissive light coloring layer is 0.5 μm or less.

3. Transparent Substrate

The transparent substrate used in this embodiment is not particularly limited as long as it is conventionally used in a color filter. Transparent rigid materials having no flexibility such as quartz glass, synthetic quartz and the like, or transparent flexible materials having flexibility such as transparent resin films, optical resin plates and the like can be used. The transparent substrate subjected, if necessary, to a surface treatment in purpose of preventing alkali elution, imparting gas barrier property, or other purposes may be used.

4. Others

The transflective type color filter in this embodiment may have, if necessary, a black matrix and various functional layers such as a transparent electrode layer, alignment membrane, protecting layer and the like. The position of formation and materials of these layers are the same as those of conventional layers, therefore, descriptions thereof are omitted here.

(5) Fourth Embodiment

The fourth embodiment of the transflective type color filter of the present invention will be described. The transflective type color filter in this embodiment is color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, an optical route difference controlling layer, for controlling an optical route difference between a reflective light region and a transmissive light region, is formed on a surface of the convex-concave formed side of the reflective light coloring layer, and the optical route difference controlling layer comprises a refractive index improving agent, which improves a refractive index, so that a difference of the refractive index, between the reflective light coloring layer and the optical route difference controlling layer, is 0.1 or more.

This embodiment is an embodiment in which the above mentioned refractive index improving agent is contained in the optical route difference controlling layer. A difference from the third embodiment is that while the third embodiment is an embodiment in which the refractive index improving agent is not added or the refractive index improving agent is added to the reflective light coloring layer, the refractive index improving agent is contained in the optical route difference controlling layer in the present embodiment.

Thus, by adding the refractive index improving agent to the optical route difference controlling layer and allowing, though not particularly limited, the reflective light coloring layer to contain no refractive index improving agent, it is possible to provide a large refractive index difference between the both layers and it is possible to improve the light scattering effect due to the convex-concave on the surface of its liquid crystal layer side of the reflective light coloring layer.

This embodiment differs from the third embodiment only in that the materials of the reflective light coloring layer and the optical route difference controlling layer are different. Therefore, these will be explained, and other descriptions are omitted here, referring to the descriptions of the above mentioned third embodiment.

(Reflective Light Coloring Layer)

The coloring layer in this embodiment is not particularly limited, and those containing no refractive index improving agent as described above are preferable.

The refractive index of such a reflective light coloring layer is not particularly limited, and the refractive index of the reflective light coloring layer may usually be the refractive index so that the refractive index difference from a layer in contact with the surface of the convex-concave formed side is 0.1 or more. In general, the refractive index of the reflective light coloring layer formed by using an acrylic resin is in a range of 1.49 to 1.50. The reason for this is that, to obtain the refractive index difference from the optical route difference controlling layer or the flattening layer, the above mentioned range is preferable.

The material for forming the reflective light coloring layer in this embodiment is not particularly limited as long as the material can be patterned, allows transmissive of light of a predetermined wavelength and has a predetermined refractive index. Usually, those obtained by dispersing a pigment in an acrylic UV-curing resin, used in a so-called pigment dispersion method, are used.

(Optical Route Difference Controlling Layer)

In this embodiment, an optical route difference controlling layer is formed as a layer in contact with the surface of the convex-concave formed side of the above mentioned reflective light coloring layer. Here, when controlling of the optical route difference is not particularly intended, the optical route difference controlling layer functions as the flattening layer for flattening the convex-concave on the reflective light coloring layer. Therefore, in this embodiment, the optical route difference controlling layer will be described as a concept containing the flattening layer.

It is preferable that the refractive index of the optical route difference controlling layer is adjusted by the refractive index improving agent so that the refractive index difference between the optical route difference controlling layer in this embodiment the reflective light coloring layer having the convex-concave on its surface is 0.1 or more, particularly 0.2 or more, particularly 0.3 or more. The reason for this is that the higher light scattering effect can be obtained and excellent display quality can be obtained in the reflective light region.

The refractive index of the optical route difference controlling layer thus controlled is not particularly limited. Usually it is in a range of 1.5 to 2.0, particularly in a range of 1.5 to 1.8. When the refractive index is higher, the refractive index difference from an adjacent layer can be increased preferably, however, since there is a limitation to addition of the refractive index improving agent, the above mentioned range is preferable.

The material of forming an optical route difference controlling layer in this embodiment is not particularly limited as long as it is transparent. Usually, materials having relatively high refractive index are suitably used in view of a fact that the refractive index difference from the reflective light coloring layer is provided by making the refractive index of the layer higher with the refractive index improving agent.

Specifically, materials having refractive index in a range of 1.5 to 1.9, particularly in a range of 1.5 to 1.8 are suitably used.

As such material, specifically, materials such as Photoneath UR4144 (manufactured by Toray Industries, Inc.), poly(thio)urethane resin, polysulfide resin, polyvinyl resin, allyl diglycol carbonate resin, poly(thio) ester resin, epoxy, polyether resins and the like can be used.

The optical route difference controlling layer in this embodiment becomes a layer of high refractive index by adding the refractive index improving agent to the above mentioned material. By this, the refractive index difference from the reflective light coloring layer is increased, the light scattering effect is increased and a display performance in the reflective light region is improved.

In this case, the refractive index improving agent used is the same as that explained in the above mentioned third embodiment. Therefore, descriptions thereof are not repeated. Also, the adding amount of this refractive index improving agent is the same as explained in the above mentioned third embodiment. Therefore, descriptions thereof are not repeated.

By thus adding the refractive index improving agent, it is preferable that the refractive index of the optical route difference controlling layer is increased so that the refractive index is in a range of 1.5 to 2.0, particularly in a range of 1.5 to 1.8.

By this, the refractive index difference from the reflective light coloring layer is larger by at least 0.1 or more, preferably 0.2 or more, particularly 0.3 or more.

Further in this embodiment, it is preferable that the convex-concave is formed on the surface of its liquid crystal layer side of the above mentioned optical route difference controlling layer and the refractive index improving agent is added to the optical route difference controlling layer so that the refractive index difference between the above mentioned optical route difference controlling layer and a layer in contact with the surface of the convex-concave formed side of the above mentioned optical route difference controlling layer is 0.1 or more.

By thus forming the convex-concave on the surface of the liquid crystal side of the optical route difference controlling layer, and making its refractive index different from the layer in contact with the surface of the convex-concave formed side, the light scattering effect can be obtained also on the surface of this optical route difference controlling layer. And by combining with the light scattering effect on the surface of the convex-concave side of the above mentioned reflective light coloring layer, the light scattering effect can be manifested more effectively.

The layer in contact with the surface of the convex-concave formed side of the above mentioned optical route difference controlling layer is not particularly limited. For example, it can be an optical route difference controlling layer flattening layer, for flattening the convex-concave on the surface of the optical route difference controlling layer, or a liquid crystal layer.

It is preferable that the refractive index difference from such a layer is 0.1 or more as described above, and particularly, it is preferable that the difference is 0.2 or more, particularly preferably 0.3 or more. The reason for this is that the light scattering effect can be manifested more effectively.

Descriptions regarding the convex-concave on the optical route difference controlling layer are the same as in the column of "convex-concave on surface" of the above mentioned reflective light coloring layer. Therefore, descriptions thereof are not repeated.

In this embodiment, it is preferable that the pitch in the concave portion of the above mentioned reflective light coloring layer is different from the pitch in the concave portion of the optical route difference controlling layer. The reason for this is that, when they are the same pitch, there is a possibility of exerting an adverse effect by interference of light.

(6) Fifth Embodiment

The fifth embodiment of the transflective type color filter of the present invention will be described. The transflective type color filter in this embodiment is color filter for transflective type color liquid crystal display comprising a transparent substrate and a reflective light coloring layer and a transmissive light coloring layer formed on the transparent substrate, wherein, a convex-concave is formed on a surface of a liquid crystal layer side of the reflective light coloring layer, and an average thickness of the reflective light coloring layer is formed to be thinner than the thickness of the transmissive light coloring layer, an optical route difference controlling layer, for controlling an optical route difference between a reflective light region and a transmissive light region, is formed on a surface of the convex-concave formed side of the reflective light coloring layer, and the convex-concave is formed also on a surface of a liquid crystal side of the optical route difference controlling layer, a optical route difference controlling layer flattening layer is formed on the surface of the convex-concave formed side of the optical route difference controlling layer to flatten the surface of the optical route difference controlling layer, and a difference of the refractive index, between the optical route difference controlling layer and the optical route difference controlling layer flattening layer, is 0.1 or more.

By thus forming the convex-concave on the surface of the liquid crystal side of the optical route difference controlling layer, and making its refractive index different from the refractive index of the optical route difference controlling layer flattening layer, which is in contact with this convex-concave surface, the light scattering effect can be obtained also on the surface of this optical route difference controlling layer. And by combining with the light scattering effect on the surface of the convex-concave side of the above mentioned reflective light coloring layer, the light scattering effect can be manifested more effectively.

Figure 14:
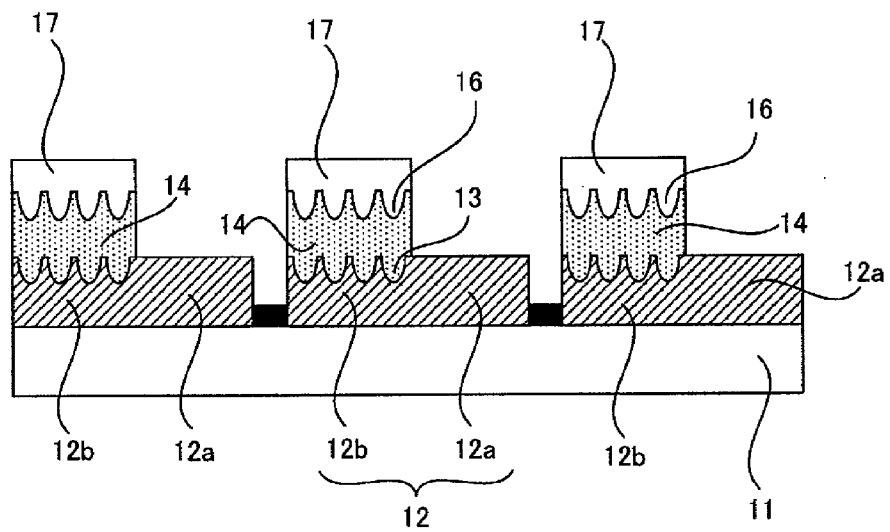
FIG. 14 is a schematic sectional view showing another example of the transflective type color filter in the present invention.

FIG. 14 shows an example of the convex-concave formed on the surface of the above mentioned optical route difference controlling layer. In this example, on a transparent substrate 11, a coloring layer 12, composed of a transmissive light coloring layer 12a and a reflective light coloring layer 12b, is formed in the same manner as in the example shown in FIG. 13. And on the opposite surface of the transparent substrate 11 of the above mentioned reflective light coloring layer 12b, a plurality of concave portions 13 are formed. On the surface of the concave portions 13 formed side of the above mentioned reflective light coloring layer 12b, an optical route controlling layer 14 is formed. On the surface opposite to the transparent substrate 11 of this optical route controlling layer 14, an optical route controlling layer concave portion 16 is further formed. An optical route difference controlling layer flattening layer 17, for flattening this optical route controlling layer concave portion 16, is formed on the surface of the optical route controlling layer concave portion 16 formed side of the optical route controlling layer 14.

In this case, it is preferable that the refractive index of the optical route controlling layer 14 differs from the refractive index of the above mentioned reflective light coloring layer 12b and the refractive index of the optical route difference controlling layer flattening layer 17 by 0.1 or more. By such a constitution, the light scattering effect can be obtained in two regions, the concave portion 13 region of the reflective light coloring layer 12b and the optical route controlling layer concave portion 16 region of the optical route controlling layer 14. Therefore, by using such a transflective type color filter, a color liquid crystal display showing extremely high display quality in the reflective light region can be obtained.

The transflective type color filter in this embodiment will be described in detail below. The first characteristic of this embodiment is that the convex-concave is formed on the surface of its liquid crystal side of the optical route difference controlling layer.

Descriptions regarding the convex-concave on the above mentioned optical route difference controlling layer are the same as in the column of "convex-concave on surface" of the above mentioned reflective light coloring layer. Therefore, descriptions thereof are not repeated.

In this embodiment, it is preferable that the pitch in the concave portion of the above mentioned reflective light coloring layer is different from the pitch in the optical route difference controlling layer concave portion of the optical route difference controlling layer. The reason for this is that, when they are the same pitch, there is a possibility of exerting an adverse effect by interference of light.

Next, the second characteristic in this embodiment is that the optical route difference controlling layer flattening layer is formed on the surface of the convex-concave formed side of the above mentioned optical route difference controlling layer, and the refractive index difference between this optical route difference controlling layer flattening layer and the optical route difference controlling layer is 0.1 or more. Further, it is preferable that the refractive index improving agent is added to this optical route difference controlling layer flattening layer to further increase the refractive index.

Such a material forming the optical route difference controlling layer flattening layer is not particularly limited as long as it is a material which is transparent and can be patterned. General photo-setting resins are suitably used. Considering the fact that the refractive index improving agent is added to this optical route difference controlling layer flattening layer to give a layer of high refractive index as described above, it is preferable that this is formed of a material having relatively high refractive index. The reason for this is that, by selecting this material, the refractive index of the finally obtained optical route difference controlling layer flattening layer can be high, and the refractive index difference from the optical route difference controlling layer can be increased. Consequently, the light scattering effect can be improved.

Descriptions regarding the above mentioned material having relatively high refractive index are the same in the column of optical route difference controlling layer of the above mentioned fourth embodiment. Therefore, descriptions thereof are not repeated.

The refractive index improving agent added to the above mentioned optical route difference controlling layer flattening layer and the adding amount thereof, further, the refractive index of the final optical route difference controlling layer flattening layer and the like are also the same as in the column of optical route difference controlling layer in the above mentioned fourth embodiment. Therefore, descriptions thereof are not repeated.

In this embodiment, the optical route difference controlling layer flattening layer is a layer of high refractive index as described above. Therefore, it is preferable that the optical route difference controlling layer is formed of a material having relatively low refractive index. The reason for this is that, by forming the optical route difference controlling layer with a material of low refractive index as described above, the refractive index difference from the optical route difference controlling layer flattening layer can be increased. And by this, the light scattering effect can be improved. The fact, that the optical route difference controlling layer is formed of a material having relatively low refractive index, is the same as for the optical route difference controlling layer in the above mentioned third embodiment. Therefore, descriptions thereof are not repeated here.

Further in this embodiment, it is preferable that the refractive index improving agent is also added to the reflective light coloring layer so that the refractive index difference from the optical route difference controlling layer is 0.1 or more. The reason for this is that, by thus adding the refractive index improving agent to the reflective light coloring layer, to make the layer of high refractive index, it is possible to improve the light scattering effect at the convex-concave formed on the surface of the optical route difference controlling layer side of the reflective light coloring layer. By combining with the light scattering effect at the convex-concave provided on the surface on the liquid crystal side of the above mentioned optical route difference controlling layer, fairly effective light scattering can be conducted.

Descriptions regarding addition of the refractive index improving agent to the reflective light coloring layer as described above are the same as for the reflective light coloring layer in the third embodiment. Therefore, descriptions thereof are not repeated here.

Descriptions regarding other layers, descriptions on the convex-concave and the like, and other points that are not described in the above mentioned present embodiments, are the same as in the above mentioned third embodiment. Therefore, descriptions thereof are not repeated here.

(7) Sixth Embodiment

Next, the sixth embodiment of the present invention will be described. The transflective type color filter in this embodiment is a color filter for transflective type color liquid crystal display comprising a transparent substrate and a reflective light coloring layer and a transmissive light coloring layer formed on the transparent substrate, wherein at least one removal portion is formed so that an average thickness of the reflective light coloring layer is thinner than the thickness of the transmissive light coloring layer, an optical route difference controlling layer, for controlling an optical route difference between a reflective light region and a transmissive light region, is formed on a surface of a liquid crystal layer side of the reflective light coloring layer, a convex-concave is formed on a surface of a liquid crystal layer side of the optical route difference controlling layer, and a refractive index difference between the optical route difference controlling layer and a layer in contact with the surface of the convex-concave formed side of the optical route difference controlling layer, is 0.1 or more.

In the present invention, since the convex-concave is formed on the surface of the optical route difference controlling layer necessary for controlling optical route difference, and the refractive index difference from a layer in contact with the surface of the convex-concave formed side is 0.1 or more, the light scattering effect can be obtained at this optical route difference controlling layer. Further, it is preferable to add the refractive index improving agent to the optical route difference controlling layer. There will be an effect that the optical route difference, in a liquid crystal layer, between the reflective light region and the transmissive light region can be controlled, and simultaneously, the quality of image display in the reflective light region can be improved.

Figure 15:
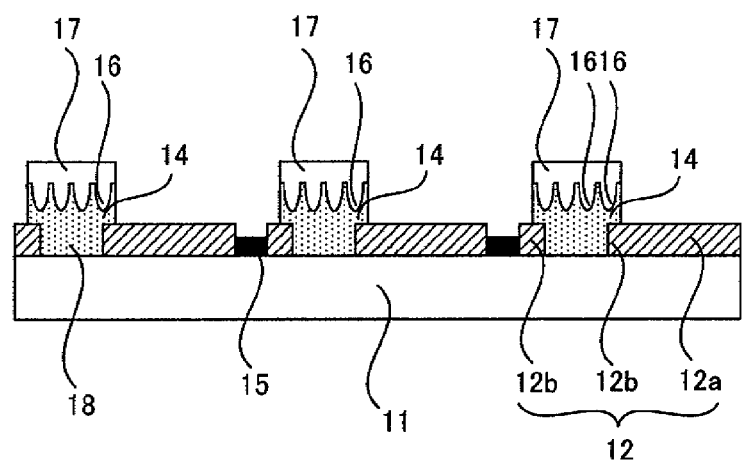
FIG. 15 is a schematic sectional view showing another example of the transflective type color filter in the present invention.

FIG. 15 shows one example of this embodiment. In this example, on a transparent substrate 11, a coloring layer 12, composed of a transmissive light coloring layer 12a and a reflective light coloring layer 12b, is formed. The reflective light coloring layer 12b in this example has the same thickness as that of the transmissive light coloring layer 12a, however, a part thereof is removed to form a removal portion 18. By thus removing a part of the reflective light coloring layer 12b, the average thickness of the reflective light coloring layer 12b is reduced. And by this, the color tone of the transmissive light region and the color tone of the reflective light region are adjusted to be the same.

On the reflective light coloring layer, an optical route difference controlling layer 14 is formed, and on the surface opposite to the transparent substrate 11, an optical route difference controlling layer concave portion 16 is formed. Further, on the optical route difference controlling layer concave portion 16, an optical route difference controlling layer flattening layer 17 is formed. In between the coloring layers 12, a black matrix 15 is placed.

In the example shown in FIG. 15, it is also possible to add the refractive index improving agent to the optical route difference controlling layer 14 so that the refractive index difference between the optical route difference controlling layer 14 and the optical route difference controlling layer flattening layer 17 is 0.1 or more. By this, the light scattering effect can be obtained on the optical route difference controlling layer concave portion 16 formed surface of the optical route difference controlling layer 14. Therefore, both of the effect of controlling optical route difference and the light scattering effect can be obtained by only providing the optical route difference controlling layer 14 having a plurality of concave portions on its surface.

Such a transflective type color filter of this embodiment will be described by each component.

1. Coloring Layer

The coloring layer used in this embodiment is the same as that described in the above mentioned third embodiment excepting for the shape of the reflective light coloring layer. Therefore, descriptions of points other than the shape of the reflective light coloring layer are omitted.

In this embodiment, the reflective light coloring layer has a shape obtained by forming at least one removal portion so that the average thickness of the entire body of the reflective light coloring layer is thinner than the thickness of the above mentioned transmissive light coloring layer. Namely, in this embodiment, a part of the reflective light coloring layer is removed completely, to form at least one removal portion in the reflective light coloring layer.

The average thickness of the reflective light coloring layer thus reduced and the ratio thereof, to the thickness of the transmissive light coloring layer, are the same as those described in the above mentioned third embodiment. Therefore, the descriptions thereof are not repeated.

2. Optical Route Difference Controlling Layer

This embodiment is characterized in that the optical route difference controlling layer is formed on the surface of the above mentioned reflective light coloring layer, the convex-concave is formed on the surface on its liquid crystal layer side, and the refractive index improving agent can be added to the optical route difference controlling layer so that the refractive index difference between the above mentioned optical route difference controlling layer and a layer in contact with the surface of the convex-concave formed side of the above mentioned optical route difference controlling layer is 0.1 or more.

Such an optical route difference controlling layer is the same as described in the above mentioned third embodiment. And the convex-concave on its surface is also described in "convex-concave on surface" of the optical route difference controlling layer in the above mentioned fourth embodiment. Therefore, descriptions thereof are not repeated here. Further, descriptions regarding a layer in contact with the surface of the convex-concave formed side of the above mentioned optical route difference controlling layer are same as the descriptions in the column of "convex-concave on surface" of the optical route difference controlling layer in the above mentioned fourth embodiment. Therefore, descriptions thereof are not repeated here.

3. Others

Also descriptions regarding the transparent substrate in this embodiment and other layers are the same as in the above mentioned third embodiment. Therefore, descriptions thereof are not repeated here.

(8) Seventh Embodiment

Finally, the seventh embodiment of the transflective type color filter of the present invention will be described. The transflective type color filter of the present embodiment is a color filter for transflective type color liquid crystal display comprising a transparent substrate and a reflective light coloring layer and a transmissive light coloring layer formed on the transparent substrate, wherein at least one removal portion is formed so that an average thickness of the reflective light coloring layer is thinner than the thickness of the transmissive light coloring layer, an optical route difference controlling layer, for controlling an optical route difference between a reflective light region and a transmissive light region, is formed on a surface of a liquid crystal layer side of the reflective light coloring layer, a convex-concave is formed on a surface of a liquid crystal layer side of the optical route difference controlling layer, a optical route difference controlling layer flattening layer is formed on the surface of the convex-concave formed side of the optical route difference controlling layer to flatten the surface of the optical route difference controlling layer, and a difference of the refractive index, between the optical route difference controlling layer and the optical route difference controlling layer flattening layer, is 0.1 or more.

This embodiment is an embodiment in which the above mentioned refractive index improving agent is contained in the optical route difference controlling layer flattening layer. The difference from the sixth embodiment is that the refractive index improving agent is added to the optical route difference controlling layer in the sixth embodiment, while in this embodiment, the refractive index improving agent is contained in the optical route difference controlling layer flattening layer.

Thus, by adding the refractive index improving agent to the optical route difference controlling layer flattening layer and allowing, though not particularly limited, the optical route difference controlling layer to contain no refractive index improving agent, it is possible to provide a large refractive index difference between the both layers and it is possible to improve the light scattering effect by the convex-concave on the surface of its liquid crystal layer side of the above mentioned optical route difference controlling layer.

This embodiment differs from the sixth embodiment only in that the material of the optical route difference controlling layer and the material of the optical route difference controlling layer flattening layer are different. Therefore, the materials are explained and descriptions of other matters are omitted here, referring to the descriptions of the above mentioned sixth embodiment.

Descriptions regarding the optical route difference controlling layer flattening layer used in this embodiment are the same as in the above mentioned fifth embodiment. Therefore, descriptions thereof are not repeated here.

Further, it is preferable that the optical route difference controlling layer in this embodiment, though not particularly limited, contains no refractive index improving agent as described above. In this embodiment, since the optical route difference controlling layer flattening layer is a layer of high refractive index as described above, it is preferable that the optical route difference controlling layer is formed of a material having relatively low refractive index. The reason for this is that, by thus forming the optical route difference controlling layer with a material of low refractive index, the refractive index difference from the optical route difference controlling layer flattening layer can be increased. By this, the light scattering effect can be improved. The fact that the optical route difference controlling layer is formed of a material having relatively low refractive index is the same as for the optical route difference controlling layer in the above mentioned third embodiment. Therefore, descriptions thereof are not repeated here.

(9) Others

Figure 16:
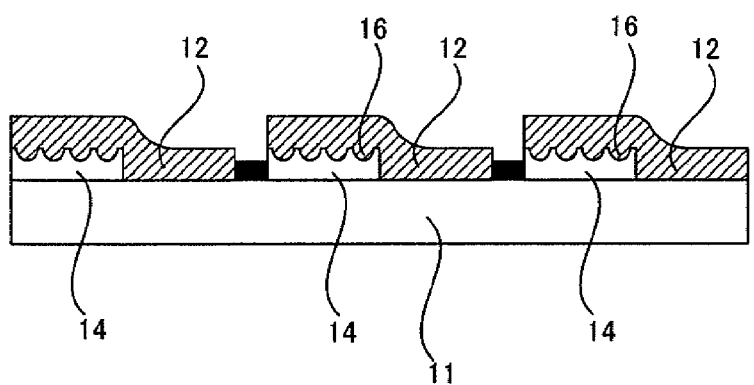
FIG. 16 is a schematic sectional view showing another example of the transflective type color filter in the present invention.

As other example of obtaining the light scattering effect by forming the convex-concave on the above mentioned surface to obtain the refractive index difference from an adjacent layer, an example as shown in FIG. 16 is mentioned.

Here, the light scattering effect is obtained by providing the convex-concave, specifically the optical route difference controlling layer concave portion 16, on an optical route difference controlling layer 14 formed on a transparent substrate 11, on the opposite surface to the transparent substrate 11, and by adding the refractive index improving agent to either one of the optical route difference controlling layer 14 and coloring layer 12 to obtain the refractive index difference between the optical route difference controlling layer 14 and the coloring layer 12.

The coloring layer 12, optical route difference controlling layer 14, optical route difference controlling layer concave portion 16 and the like used, further, the kind and adding amount of the refractive index improving agent in this example are the same as the above mentioned embodiments. Therefore, descriptions thereof are not repeated here.

(10) Transflective Type Color Liquid Crystal Display

The transflective type color liquid crystal display of the present invention is obtained by filling liquid crystal in between the above mentioned transflective type color filter and facing substrate. Therefore, the display has a merit of the above mentioned transflective type color filter, namely, a merit that manufacturing by a simple process is possible, resulting in lowering the cost.

The present invention is not limited to the above mentioned embodiments. The above mentioned embodiments are only examples, and any of those having substantially the same constitution and exhibiting the same functions and effect as the technological idea described in claims of the present invention is included in the technological range of the present invention.

EXAMPLES

The following examples will illustrate the present invention in detail below, but do not limit the scope of the invention.

Example 1

A glass substrate (soda glass, thickness: 0.7 mm) as a transparent substrate, a photosensitive acrylic resin as a transparent membrane material, and an acrylic based negative photoresist containing a pigment as a coloring layer, were prepared. A transparent membrane forming coating solution, prepared by dissolving the transparent membrane forming resin having the above mentioned composition in a solvent, was coated on this substrate uniformly by a spin coating method and the like. After drying the coating solution, a pattern composed of pore portions formed in a pattern in the transparent membrane was exposed, and then, developed, thereby forming a transparent membrane pattern layer.

Subsequently, coloring layer forming coating solution having the above mentioned composition was coated by the spin coating method. The color filter of the present invention is obtained by forming coloring layers by repeating drying, pre-baking, exposing, developing and post-baking, for each color of red, blue and green.

On the above mentioned color filter, necessary functional layers such as a transparent electrode layer and the like were formed, to obtain a liquid crystal display of the present invention. CIE (1931) xy chromaticity values, displaying red, green, blue and white when this liquid crystal display was used for transmissive light, are shown in Table 1 and FIG. 11.

Example 2

Using the same materials and method as in Example 1, a pattern, composed of pattern formed island shaped transparent membrane, was formed as a transparent membrane pattern layer. On this pattern layer, a coloring layer was formed with the same materials and method as in Example 1, obtaining a color filter of the present invention.

On the above mentioned color filter, necessary functional layers such as a transparent electrode layer and the like were formed, to obtain a liquid crystal display of the present invention. Values displaying red and green, when this liquid crystal display was used for transmissive light, are shown in Table 1 and FIG. 11.

Comparative Example 1

A reflective color filter was obtained by reducing the thickness of the coloring layer by ½ of that in the transmissive type color filter used in Example 1. To obtain the equivalent chromaticity by using a transmissive type color filter as a reflective type color filter, since light passes through the color filter twice, it may be advantageous that the thickness of the coloring layer of the reflective type color filter is reduced to ½ as compared with the coloring layer of the transmissive type color filter. On the above mentioned color filter, necessary functional layers such as a transparent electrode layer and the like were formed, and a reflective membrane composed of an aluminum membrane was placed on an array substrate facing this color filter, and a functional film such as a polarization plate and the like was placed, to obtain a reflective type liquid crystal display. Chromaticity values, in displaying red, green, blue and white using this liquid crystal display are shown in Table 1 and FIG. 11.

Comparative Example 2

The reflective light color filter used in Comparative Example 1 was used, and necessary functional layers such as a transparent electrode layer and the like were formed on the above mentioned color filter, as in Example 1 and 2, to obtain a transmissive type liquid crystal display. Chromaticity values in displaying red, green, blue and white using this liquid crystal display are shown in Table 1 and FIG. 11.

TABLE 1

| | | Red | | | Green | | | Blue | | | White | | |
|---|---|---|---|---|---|---|---|---|---|---|---|---|---|
| | BL | x | y | Y | x | y | Y | x | y | Y | x | y | Y |
| Comparative Example 1 | D65 | 0.627 | 0.341 | 23.9 | 0.313 | 0.547 | 71.2 | 0.138 | 0.163 | 21.2 | 0.311 | 0.352 | 38.8 |
| Comparative Example 2 | LED | 0.535 | 0.343 | 33.6 | 0.334 | 0.443 | 80.6 | 0.160 | 0.188 | 33.5 | 0.309 | 0.323 | 49.2 |

TABLE 1-continued

| | | Red | | | Green | | | Blue | | | White | | |
|---|---|---|---|---|---|---|---|---|---|---|---|---|---|
| | BL | x | y | Y | x | y | Y | x | y | Y | x | y | Y |
| Example 1 | LED | 0.566 | 0.347 | 29.1 | 0.331 | 0.472 | 74.0 | 0.150 | 0.164 | 26.5 | 0.307 | 0.322 | 43.2 |
| Example 2 | LED | 0.586 | 0.349 | 26.9 | 0.33 | 0.491 | 70.7 | | | | | | |

The chromaticity in Comparative Example 1 is a chromaticity when a color filter is used as the reflective display. The chromaticity in Comparative Example 2 is a chromaticity when the color filter in Comparative Example 1 is used as it is as the transmissive display. The chromaticity in Comparative Example 1 and the chromaticity in Comparative Example 2 show a large difference, namely, the chromaticity differ significantly when the same color filter as shown in Comparative Examples 1 and 2 is used for the reflective display and the transmissive display. For this reason, it can be said that when a color filter is used as the transmissive display, the color chromaticity for the transmissive display and the color chromaticity for the reflective display are close if the chromaticity value is close to Comparative Example 1.

FIG. 11 gives a result that Example 1 in the present invention shows chromaticity value closer to that in Comparative Example 1 for each color, as compared with that in Comparative Example 2 using a reflective color filter as it is for the transmissive display. Further in Example 2, a result, that the chromaticity is further closer for red and green.

(Measuring Method)

For measuring the chromaticity, a spectral photometry apparatus (MCPD-2000, manufactured by Otsuka Electronics Co., Ltd.) was used. Here, for the chromaticity for the reflective display, a D65 light source was used, and for the transmissive display, a while LED (LNJ 010 CSFRA, manufactured by Matsushita Electric Industrial Co., Ltd.) light source was used. The reason for selecting the light sources is that, in the case of the reflective display, day light is assumed mainly as outer light. Therefore, chromaticity was measured using the D65 light source which is a standard light source for day light. A white LED is generally used as a backlight for transmissive display of a liquid crystal display used for portable applications. Therefore, the white LED light source was used for measuring the chromaticity for transmissive display.

Example 3

Preliminary Experiment (1) Confirmation of Effect by Convex-Concave Shape

A transparent substrate of a substrate size of 300×400 mm and a thickness of 0.7 mm (1737 material, manufactured by Corning, Inc.) was used, and subjected to processes of cleaning with a detergent and drying.

Next, an overcoat material (IT-MP manufactured by INCTEC INC, refractive index: 1.50) was coated by a spinner (600 rpm, maintained for 10 second), and dried on a hot plate at 70° C. for 3 minutes. Then, exposed at exposing light amount of 300 mj/cm$^2$ via a mask of pattern pitch shown in FIG. 17, developed for 60 seconds with a dedicated developer, then, baked at 230° C. in an over for 30 minutes, to obtain a relief pattern having the convex-concave on the surface.

Figure 17:
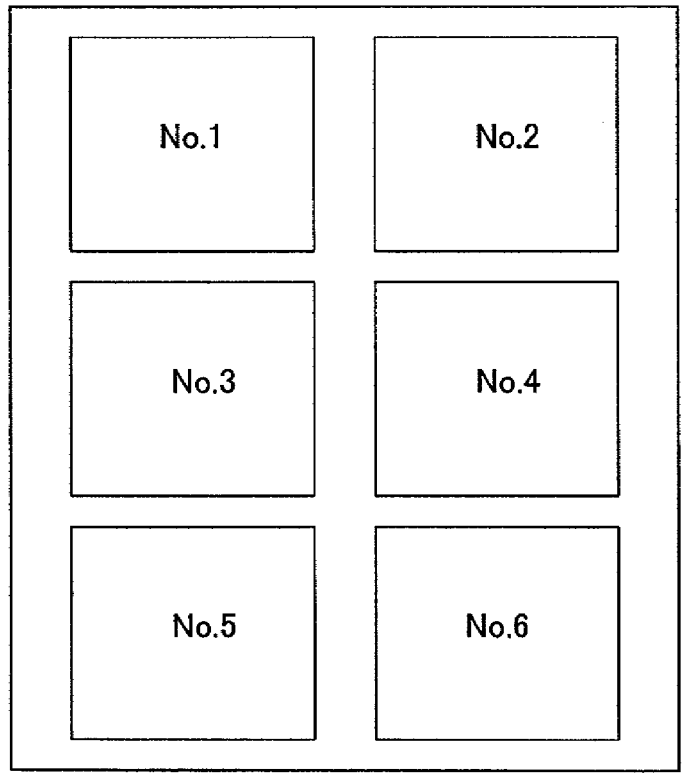
FIG. 17 is a schematic view showing an example of a mask used to confirm an effect due to convex-concave shape in an example.
Figure 18:
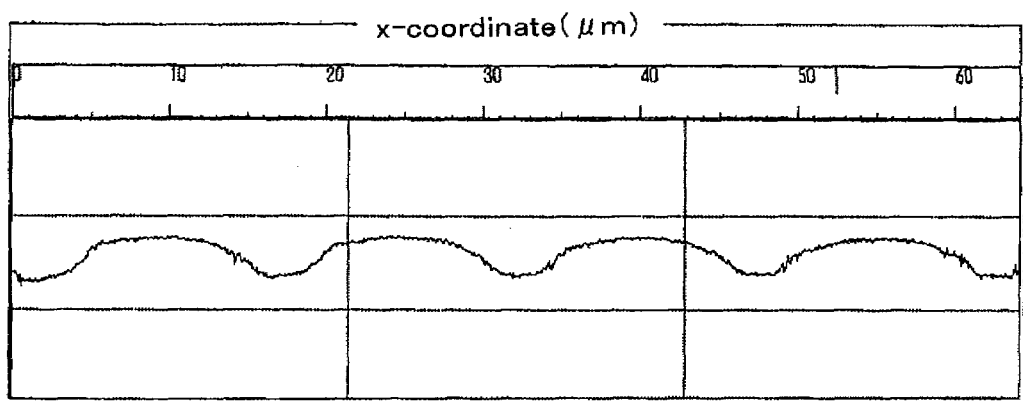
FIG. 18 is a graph showing the result of the convex-concave shape measured in order to check correlation between convex-concave shape and haze in an example.
Figure 19:
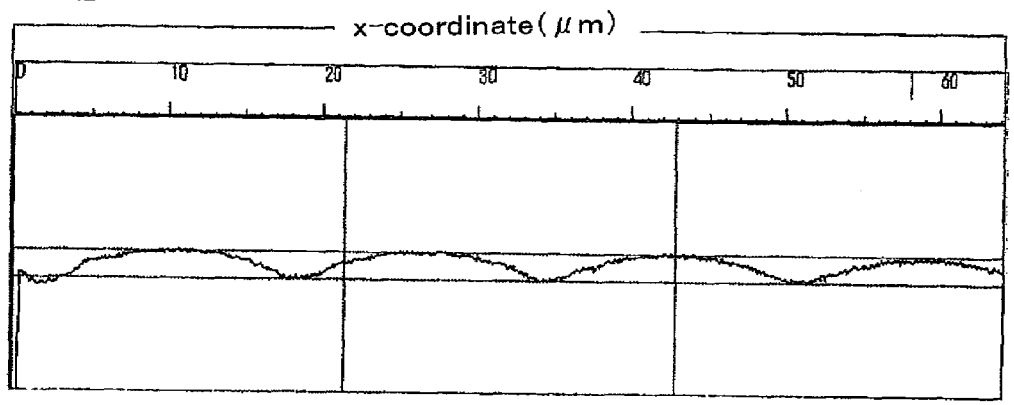
FIG. 19 is a graph showing the result of the convex-concave shape measured in order to check correlation between convex-concave shape and haze in an example.
Figure 20:
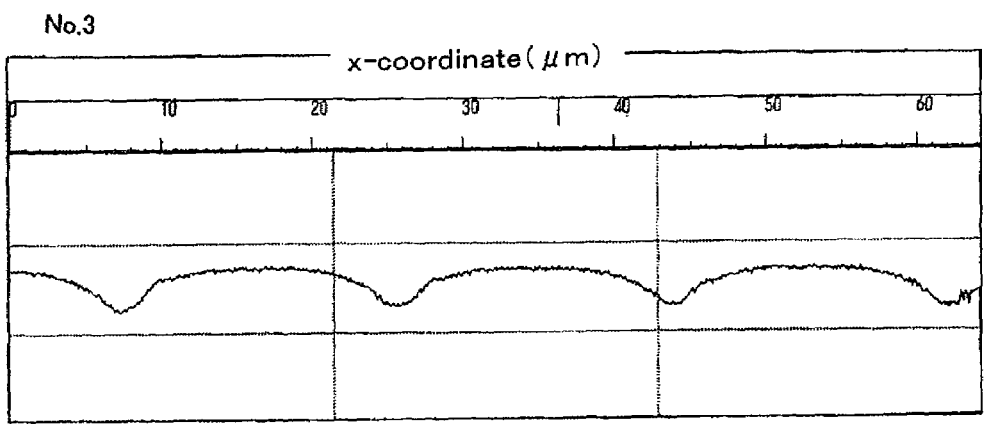
FIG. 20 is a graph showing the result of the convex-concave shape measured in order to check correlation between convex-concave shape and haze in an example.
Figure 21:
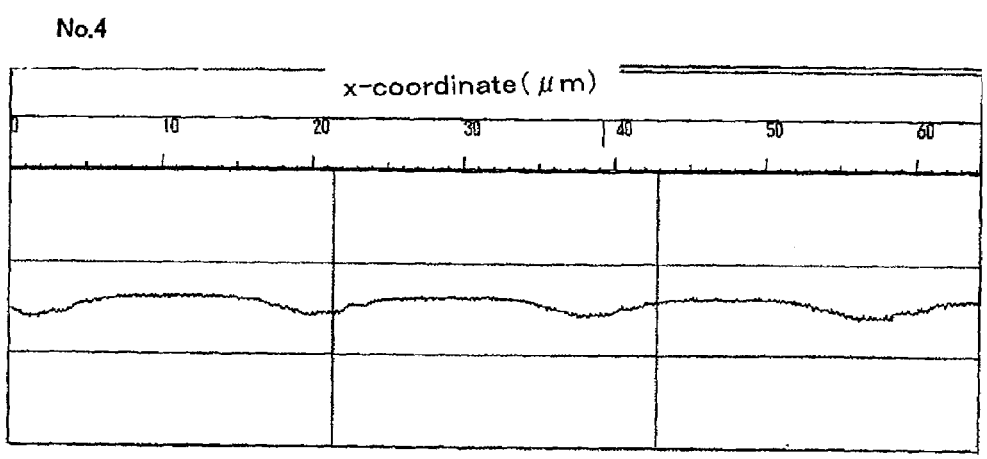
FIG. 21 is a graph showing the result of the convex-concave shape measured in order to check correlation between convex-concave shape and haze in an example.
Figure 22:
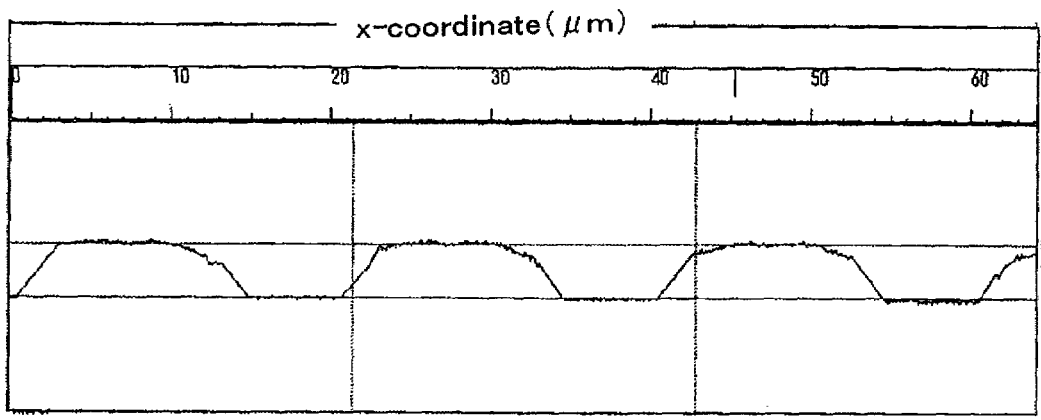
FIG. 22 is a graph showing the result of the convex-concave shape measured in order to check correlation between convex-concave shape and haze in an example.
Figure 23:
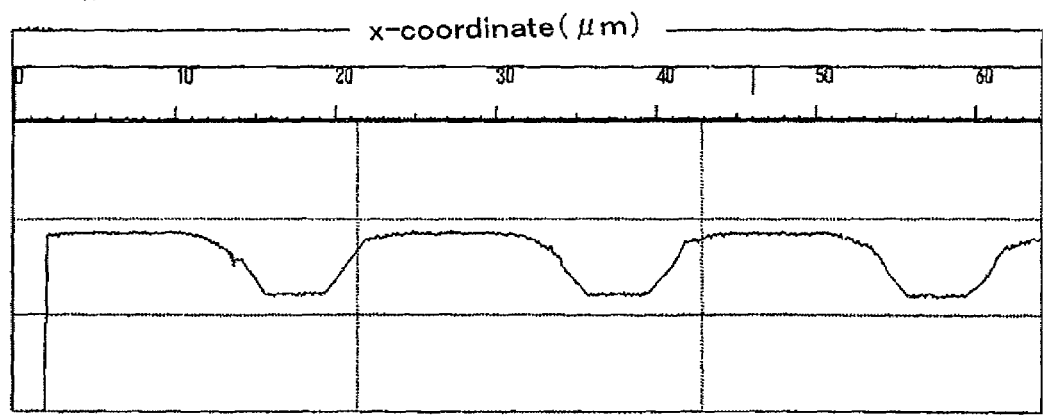
FIG. 23 is a graph showing the result of the convex-concave shape measured in order to check correlation between convex-concave shape and haze in an example.

In the mask of the above mentioned pattern pitch, the pattern was composed of dots all in cylinder shape, and the diameter and pitch of the cylinder pattern were changed for each region of No. 1 to No. 6 shown in FIG. 17. The diameters and pitches of cylinder pattern in respective regions are shown in Table 2 below.

TABLE 2

| No. | Dot ((m) | Pitch ((m) |
|---|---|---|
| 1 | 6 | 15 |
| 2 | 8 | 16 |
| 3 | 10 | 18 |
| 4 | 12 | 18 |
| 5 | 8 | 20 |
| 6 | 10 | 20 |

Next, the pattern shape and sectional shape of this substrate were observed by a scanning laser microscope VL2000D (manufactured by Lasertec Corporation), and the degree of scattering was measured by haze, transmissive, and reflectance meter HR-100 (manufactured by MURAKAMI COLOR RESEARCH LABORATORY). Measurement of haze was carried out according to JIS K7105.

The results are shown in FIGS. 18 to 23 and Table 3 below.

TABLE 3

| No. | Haze |
|---|---|
| 1 | 70.6 |
| 2 | 67.0 |
| 3 | 61.0 |
| 4 | 56.3 |
| 5 | 21.0 |
| 6 | 28.9 |

It is clear from the results that, when the pattern shows a discontinuous shape, haze value is high, showing a correlation between haze and pattern shape.

(2) Confirmation of Influence Due to Refractive Index Difference

A liquid crystal material (refractive index: 1.45) was dropped on the substrate used in the above mentioned section (1) Confirmation of effect by convex-concave shape, a transparent substrate having no pattern formed was laminated, and haze was measured in the same manner as described above. The measurement results are shown in Table 4 below.

TABLE 4

| No. | Haze |
|---|---|
| 1 | 3.7 |
| 2 | 5.0 |
| 3 | 4.2 |
| 4 | 2.9 |
| 5 | 5.5 |
| 6 | 6.0 |

From the results in the above mentioned Table 3, it is clear that the haze value, which was excellent in the above mentioned section (1) Confirmation of effect by convex-concave shape, has decreased. This shows an influence by the refractive index difference, and it can be estimated that the haze value was excellent since the refractive index difference between an overcoat material (refractive index: 1.5) and air (refractive index: 1.0) is as large as 0.5, in the above mentioned section (1) Confirmation of effect by convex-concave shape.

(3) Conformation of Refractive Index Difference by Pseudo-panel

Further, hypothesizing the same constitution as that of a current display, on the substrate used in the above mentioned section (1) Confirmation of effect by convex-concave shape, an ITO membrane (1500 Å, refractive index: 1.8) was formed by sputtering and an alignment membrane (600 Å, refractive index: 1.6) was formed by spin coating. Regarding this substrate, the haze value was measured by the same method as the above mentioned section (2) Confirmation of influence due to refractive index difference. The measurement results are shown in Table 5 below.

TABLE 5

| No. | Haze |
|---|---|
| 1 | 3.5 |
| 2 | 4.8 |
| 3 | 4.1 |
| 4 | 2.7 |
| 5 | 5.2 |
| 6 | 5.4 |

When the results in Table 4 and the results in table 5 are compared, there is almost no variation in haze value. This shows that both of the ITO membrane and alignment membrane have small thickness so that there is no influence on the refractive index difference.

From the above mentioned results, it was found that the pattern shape and the refractive index difference are important factors.

Next, a transparent substrate of a substrate size of 300×400 mm and a thickness of 0.7 mm (1737 material, manufactured by Corning, Inc.) was used, and subjected to processes of cleaning with a detergent and drying.

Next, a Cr membrane was formed in a thickness of 1500 Å by sputtering, a positive resist was coated, and subjected to processes of pre-baking, exposure, development, etching and peeling, by ordinary methods, to form a black matrix substrate.

Next, coloring sensitive materials having a refractive index of 1.5 shown below were used to form a coloring layer.

R sensitive material: Color mosaic CR9000 (manufactured by FUJIFILM Arch Co., Ltd.)

G sensitive material: Color mosaic CG9000 (manufactured by FUJIFILM Arch Co., Ltd.)

B sensitive material: Color mosaic CB9000 (manufactured by FUJIFILM Arch Co., Ltd.)

(Formation of R Stripe Pattern)

On the above mentioned black matrix substrate, the R sensitive material was coated by a spinner (620 rpm, maintained for 10 seconds), and pre-baked and dried at 80° C. for 3 minutes. Then, using a mask having a repetition pattern shown in FIG. 24, exposed at 100 mj/cm$^2$, developed (for 70 seconds with dedicated developer), post-baked (230° C., 30 minutes), to form a stripe pattern having the convex-concave at a reflective part.

This pattern was observed by a laser microscope, and hypothesizing that the concave portion is in the form of hemisphere, the average thickness of the reflective part was calculated by subtracting from the thickness of the transmissive part. The thickness of the transmissive part was 2.0 µm, and the average thickness of the reflective part was 1.0 µm.

(Formation of G Stripe Pattern)

A G stripe pattern was formed in the same manner as for the R stripe pattern except that coating conditions were a revolution of 560 rpm and a development time of 130 seconds. The thickness of the transmissive part was 2.0 µm, and the average thickness of the reflective part was 1.0 µm.

(Formation of B Stripe Pattern)

A B stripe pattern was formed in the same manner as for the R stripe pattern except that coating conditions were a revolution of 690 rpm and a development time of 65 seconds. The thickness of the transmissive part was 2.0 µm, and the average thickness of the reflective part was 1.0 µm.

(Formation of Optical Route Difference Controlling Layer)

Figure 25:
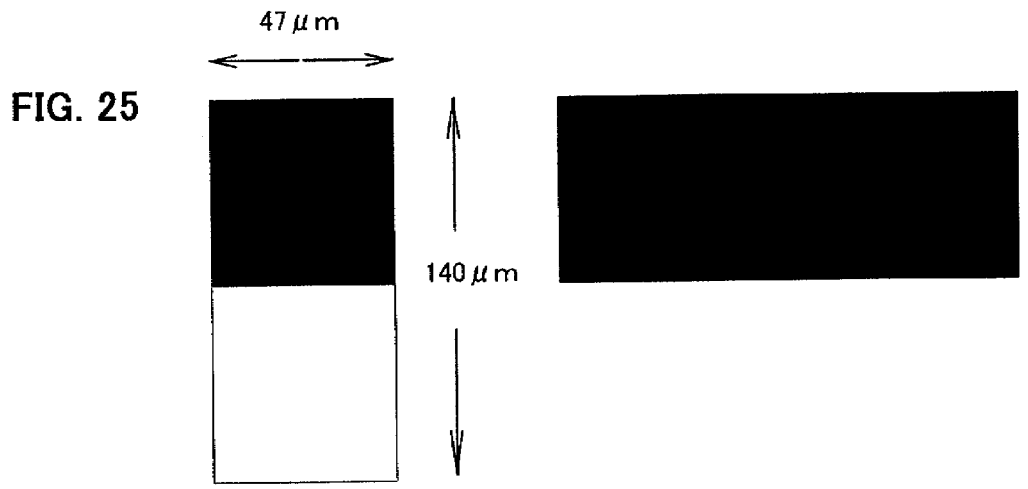
FIG. 25 is a schematic view showing an example of a mask used in forming an optical route difference controlling layer in Example 3.

As the optical route difference controlling layer, a polyimide resin (Photoneath UR4144, manufactured by Toray Industries, Inc., refractive index: 1.6) was coated by a spinner (1000 rpm, maintained for 10 seconds), dried at 90° C. for 3 minutes as pre-bake, then, using a mask having a repetition pattern shown in FIG. 25, exposed at 300 mj/cm$^2$, developed (for 60 seconds with dedicated developer), post-baked (230° C., 30 minutes), to form the optical route difference controlling layer only at the reflective part. By this, the refractive index difference between the optical route difference controlling layer and coloring layer was controlled to be 0.1, and the thickness of the reflective part could be controlled to be 4.3 µm and the thickness of the transmissive part could be controlled to be 2.0 µm.

Next, an ITO membrane was formed in a thickness of 1500 Å by sputtering, a columnar shaped spacer forming material (Optomer, manufactured by JSR Corporation) was coated to be a thickness of 2.3 µm after post-baking, and a mask for forming a columnar shaped spacer was used to a part corresponding to the black matrix in the reflective part, to form a columnar shaped spacer in the reflective part. An alignment membrane was coated on a rear surface electrode substrate and a color filter substrate and rubbed. Then, a sealing material was coated on a peripheral sealing part, laminated, nematic liquid crystal was enclosed as a liquid crystal substance, an enclosing port was sealed, and a polarization plate and a retardation plate were incorporated, to fabricate a transflective color liquid crystal display.

Voltage was applied between a transparent electrode layer provided on the above mentioned rear surface side electrode substrate and a transparent electrode substrate provided on the color filter substrate to display an image. As a result, sufficiently bright display of a color image was confirmed with the incidence light from back light. In the same manner, an image was displayed by applying a voltage between a metal reflective electrode provided on the rear surface side electrode substrate and a transparent electrode substrate provided on the color filter substrate. As a result, a sufficiently bright clear display as same as the transmissive light was obtained with incidence light for reflective, though the light passes through the color filter twice, in comparison with transmissive light display.

Example 4

The same process as in Example 3 was carried out except the formation of the optical route difference controlling layer described below.

Figure 26:
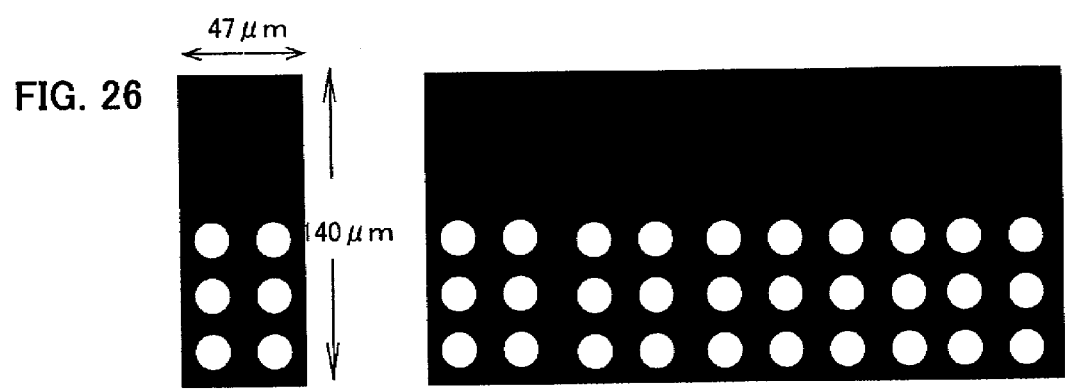
FIG. 26 is a schematic view showing an example of a mask used in forming an optical route difference controlling layer in Example 4.

As the optical route difference controlling layer, a polyimide resin (Photoneath UR4144, manufactured by Toray Industries, Inc., refractive index: 1.6) was coated by a spinner (1000 rpm, maintained for 10 seconds), dried at 90° C. for 3 minutes as pre-bake, then, using a mask having a repetition pattern shown in FIG. 26, exposed at 300 mj/cm², developed (for 60 seconds with dedicated developer), post-baked (230° C., 30 minutes), to form the optical route difference controlling layer having the convex-concave on the surface only in the reflective part. By this, the refractive index difference between the optical route difference controlling layer and coloring layer was controlled to be 0.1, the refractive index difference between the optical route difference controlling layer and liquid crystal layer (refractive index: 1.45) was controlled to be 0.15, and, as in Example 3, the thickness of the reflective part could be controlled to be 4.3 µm and the thickness of the transmissive part could be controlled to be 2.0 µm.

It was observed as a transflective color liquid crystal display like in Example 3 to find that visual dependency was further improved in reflective mode.

Example 5

The same process as in Example 3 was carried out except the formation of the optical route difference controlling layer described below.

Figure 24:
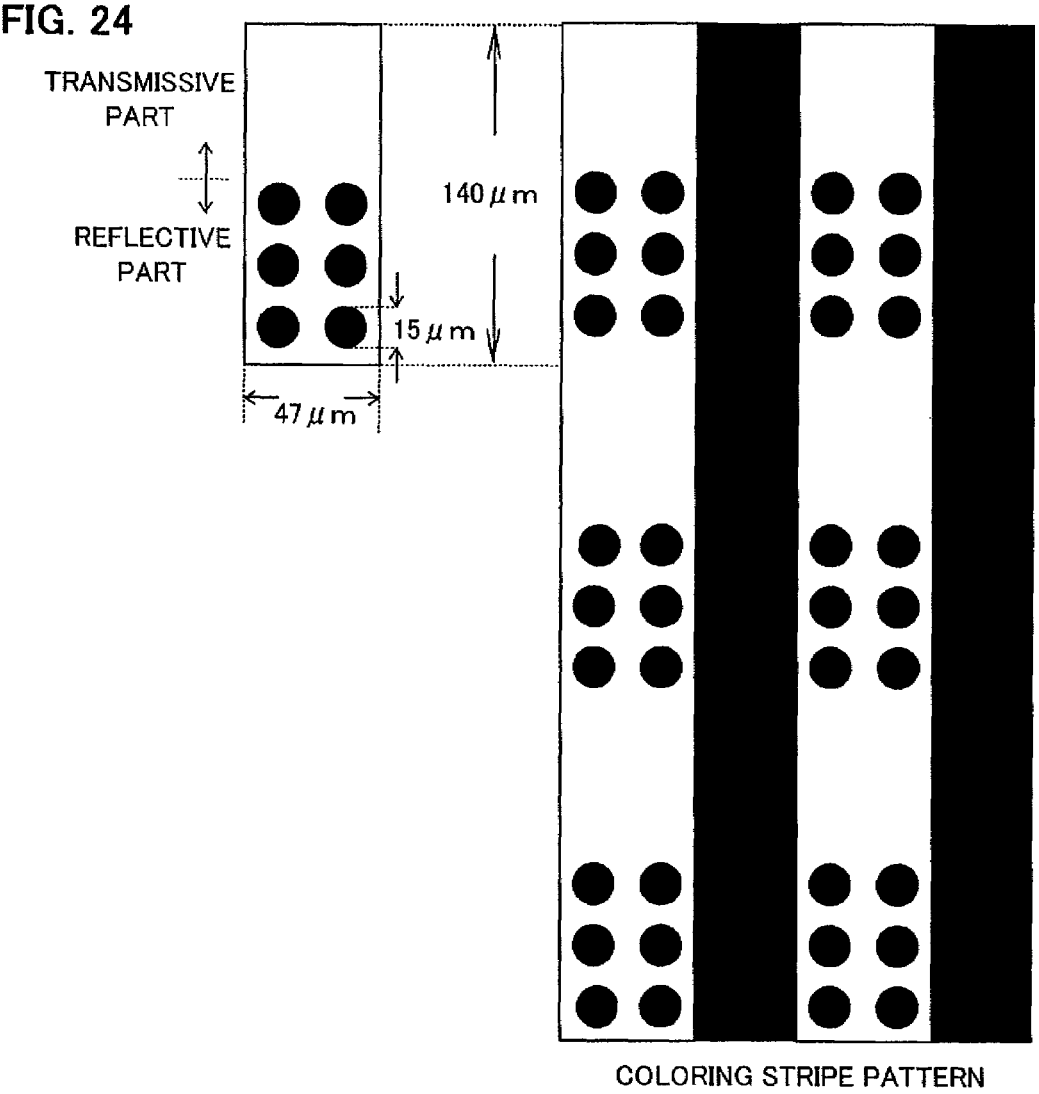
FIG. 24 is a schematic view showing an example of a mask used in forming a R stripe pattern in Example 3.

As the optical route difference controlling layer, a material of low refractive index (Opstar JN, manufactured by JSR Corporation, refractive index: 1.4) was coated by a spinner (1000 rpm, maintained for 30 seconds), dried at 90° C. for 3 minutes as pre-bake, then, using a mask having a repetition pattern shown in FIG. 24, exposed at 300 mj/cm², developed (for 60 seconds with dedicated developer), post-baked (230° C., 30 minutes), to form the optical route difference controlling layer only in the reflective part. By this, the refractive index difference between the optical route difference controlling layer and coloring layer was controlled to be 0.1, and the thickness of the reflective part could be controlled to be 4.3 µm and the thickness of the transmissive part could be controlled to be 2.0 µm.

It was observed as a transflective color liquid crystal display like in Example 3 to find the same effect.

Example 6

The same process as in Example 3 was carried out except the formation of the optical route difference controlling layer described below.

As the optical route difference controlling layer, a material of low refractive index (Opstar JN, manufactured by JSR Corporation, refractive index: 1.4) was coated by a spinner (1000 rpm, maintained for 30 seconds), dried at 90° C. for 3 minutes as pre-bake, then, using a mask having a repetition pattern shown in FIG. 25, exposed at 300 mj/cm², developed (for 60 seconds with dedicated developer), post-baked (230° C., 30 minutes), to form the optical route difference controlling layer having the convex-concave only on the surface of the reflective part. By this, the refractive index difference between the optical route difference controlling layer and coloring layer was controlled to be 0.1, the refractive index difference between the optical route difference controlling layer and liquid crystal layer (refractive index: 1.45) was controlled to be 0.05, and, as in Example 3, the thickness of the reflective part could be controlled to be 4.3 µm and the thickness of the transmissive part could be controlled to be 2.0 µm.

It was observed as a transflective color liquid crystal display like in Example 3 to find that visual dependency was improved slightly in reflective mode as compared with Example 3.

Example 7

The same process as in Example 3 was carried out except the formation of the optical route difference controlling layer described below.

As the optical route difference controlling layer, a material obtained by dispersing titanium oxide fine particles in an overcoat material (IT-MR, manufactured by INCTEC INC, refractive index: 1.50) was coated by a spinner (1000 rpm, maintained for 10 seconds), dried at 90° C. for 3 minutes as pre-bake, then, using a mask having a repetition pattern shown in FIG. 25, exposed at 300 mj/cm², developed (for 60 seconds with dedicated developer), post-baked (230° C., 30 minutes), to form the optical route difference controlling layer only in the reflective part. The refractive index of the overcoat material containing dispersed titanium oxide fine particles was 1.65. The refractive index difference between the optical route difference controlling layer and coloring layer was controlled to be 0.15. The thickness of the reflective part could be controlled to be 4.3 µm and the thickness of the transmissive part could be controlled to be 2.0 µm.

It was observed as a transflective color liquid crystal display like in Example 3 to find that visual dependency was further improved in reflective mode.

Example 8

The same process as in Example 3 was carried out except the formation of the optical route difference controlling layer described below.

As the optical route difference controlling layer, a material obtained by dispersing titanium oxide fine particles in an overcoat material (IT-MR, manufactured by INCTEC INC, refractive index: 1.50) was coated by a spinner (1000 rpm, maintained for 10 seconds), dried at 90° C. for 3 minutes as pre-bake, then, using a mask having a repetition pattern shown in FIG. 26, exposed at 300 mj/cm², developed (for 60 seconds with dedicated developer), post-baked (230° C., 30 minutes), to form the optical route difference controlling layer having the convex-concave only on the surface of the reflective part. The refractive index of the overcoat material containing dispersed titanium oxide fine particles was 1.65. The refractive index difference between the optical route difference controlling layer and liquid crystal layer (refractive index: 1.45) could be controlled to be 0.20, and the refractive index difference between the optical route difference controlling layer and coloring layer could be controlled to be 0.15. The thickness of the reflective part could be controlled to be 4.3 µm like in Example 3 and the thickness of the transmissive part could be controlled to be 2.0 µm.

It was observed as a transflective color liquid crystal display like in Example 3 to find that visual dependency was further improved in reflective mode.

Comparative Example 3

The same process as in Example 3 was carried out except the below mentioned formation material of the optical route difference controlling layer.

An overcoat material (IT-MR, manufactured by INCTEC INC, refractive index: 1.50) was used as an optical route controlling material. The refractive index difference between the optical route difference controlling layer and coloring layer was 0, and the refractive index difference between the optical route difference controlling layer and liquid crystal layer was 0.05.

It was observed as a transflective color liquid crystal display like in Example 3 to find that brightness was inferior in reflective mode as compared with transmissive mode.

Comparative Example 4

The same process as in Example 4 was carried out except the below mentioned formation material of the optical route difference controlling layer.

An overcoat material (IT-MR, manufactured by INCTEC INC, refractive index: 1.50) was used as an optical route controlling material. The refractive index difference between the optical route difference controlling layer and coloring layer was 0, and the refractive index difference between the optical route difference controlling layer and liquid crystal layer was 0.05.

It was observed as a transflective color liquid crystal display like in Example 3 to find that brightness was inferior in reflective mode as compared with transmissive mode.

We claim:

1. A color filter for transflective type color liquid crystal display comprising a transparent substrate and a reflective light coloring layer and a transmissive light coloring layer formed on the transparent substrate,
    wherein at least one removal portion is formed so that an average thickness of the reflective light coloring layer is thinner than a thickness of the transmissive light coloring layer,
    an optical route difference controlling layer, for controlling an optical route difference between a reflective light region and a transmissive light region, is formed on a surface of a liquid crystal layer side of the reflective light coloring layer,
    a convex-concave is formed on a surface of a liquid crystal layer side of the optical route difference controlling layer, and
    a refractive index difference, between the optical route difference controlling layer and a layer in contact with the surface of the convex-concave formed side of the optical route difference controlling layer, is 0.1 or more.

2. The color filter for transflective type color liquid crystal display according to claim 1, wherein the optical route difference controlling layer comprises a refractive index improving agent, which improves a refractive index, so that the refractive index difference, between the optical route difference controlling layer and the layer in contact with the surface of the convex-concave formed side of the optical route difference controlling layer, is 0.1 or more.

3. The color filter for transflective type color liquid crystal display according to claim 1, wherein the layer in contact with the surface of the convex-concave formed side of the optical route difference controlling layer is an optical route difference controlling layer flattening layer to flatten the surface of the optical route difference controlling layer.

4. The color filter for transflective type color liquid crystal display according to claim 3, wherein the optical route difference controlling layer flattening layer comprises refractive index improving agent, which improves a refractive index, so that a refractive index difference, between the optical route difference controlling layer and the optical route difference controlling layer flattening layer, is 0.1 or more.

5. The color filter for transflective type color liquid crystal display according to claim 1, wherein the convex-concave on the surface of the optical route difference controlling layer is composed of a plurality of concave portions formed by a curved surface on the surface of the optical route difference controlling layer.

6. A transflective color liquid crystal display comprising the color filter for transflective type color liquid crystal display according to claim 1.

* * * * *